(12) United States Patent
Koike

(10) Patent No.: US 6,349,171 B1
(45) Date of Patent: Feb. 19, 2002

(54) TAKING LENS AND LENS-FITTED FILM UNIT EQUIPPED WITH THE TAKING LENS

(75) Inventor: Kazumi Koike, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/586,994

(22) Filed: Jun. 5, 2000

(30) Foreign Application Priority Data

Jun. 4, 1999 (JP) .......................................... 11-158725

(51) Int. Cl.[7] .......................... G03B 17/02; G03B 17/24
(52) U.S. Cl. ........................... 396/6; 396/311; 396/315; 396/319; 359/642
(58) Field of Search .............................. 396/6, 311, 315, 396/319, 207, 208; 359/642, 717, 718

(56) References Cited

U.S. PATENT DOCUMENTS

| | | | | |
|---|---|---|---|---|
| 6,052,233 A | * | 4/2000 | Koike | .......................... 359/642 |
| 6,104,877 A | * | 8/2000 | Smart et al. | .................... 396/6 |
| 6,272,287 B1 | * | 8/2001 | Cipolla et al. | .................. 396/6 |

\* cited by examiner

*Primary Examiner*—Alan A. Mathews
(74) *Attorney, Agent, or Firm*—Young & Thompson

(57) ABSTRACT

A lens-fitted film unit with a preloaded filmstrip has a taking lens for forming an image on the filmstrip placed on an image surface that is curved in a lengthwise direction of the filmstrip and has a center of curvature on the object end so as to correct the curvature of field of the taking lens in the image surface. The taking lens comprising in order from the object end to the image end a meniscus first lens element having a convex object side surface and a meniscus second lens element having a convex image side surface satisfies the condition $-10\% \leq Ds \leq Db - 0.5\%$ ($10\%$ where Ep is the axial distance between the curved image surface and an exit pupil of the taking lens and takes a value in mm greater than zero, $\delta$ is the axial distance of opposite lengthwise ends of the curve image surface from the center of the curved image surface and takes a value in mm greater than zero, Ds is optical distortion in a plane including a paraxial focal point of light rays traveling from the exit pupil of the taking lens to a corners of the curved image surface and take a value in %, and Db is given by $(\delta/Ep) \times 100\%$.

14 Claims, 25 Drawing Sheets

LONGITUDINAL ABERRATION(0.35d)

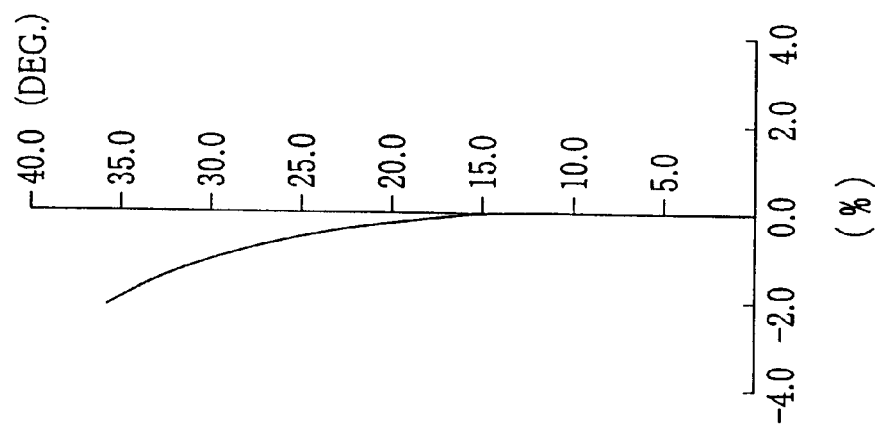
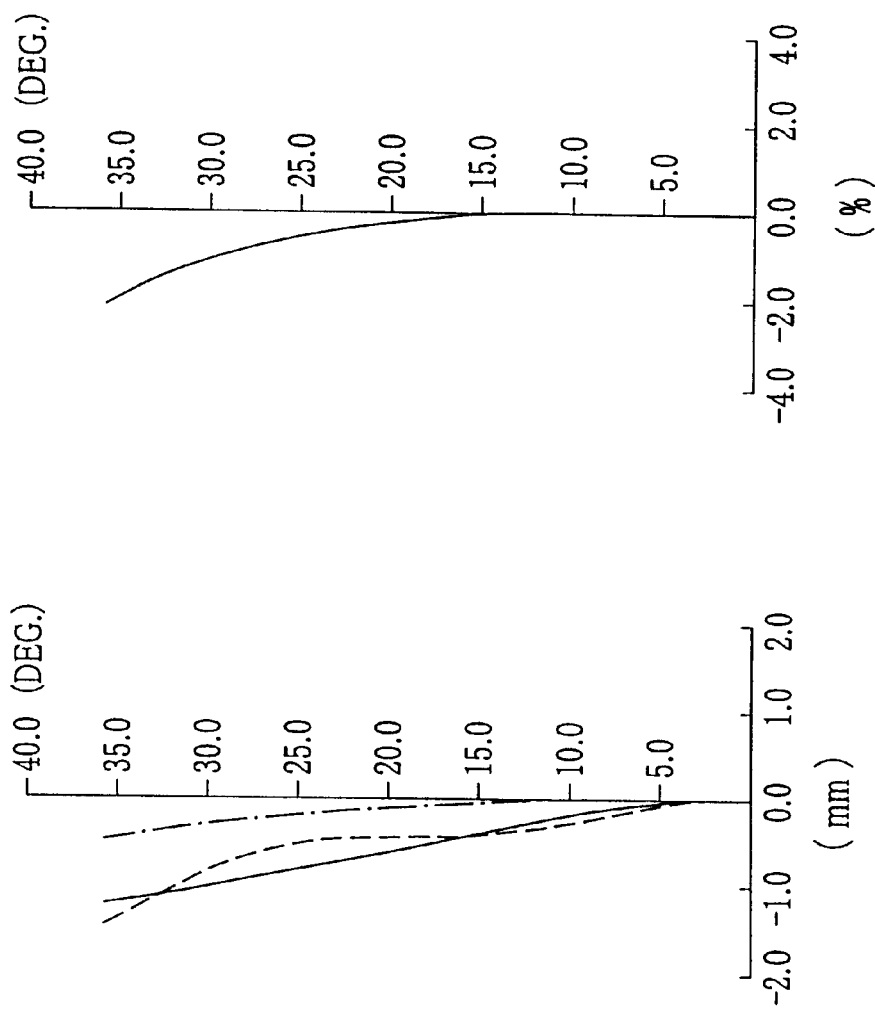
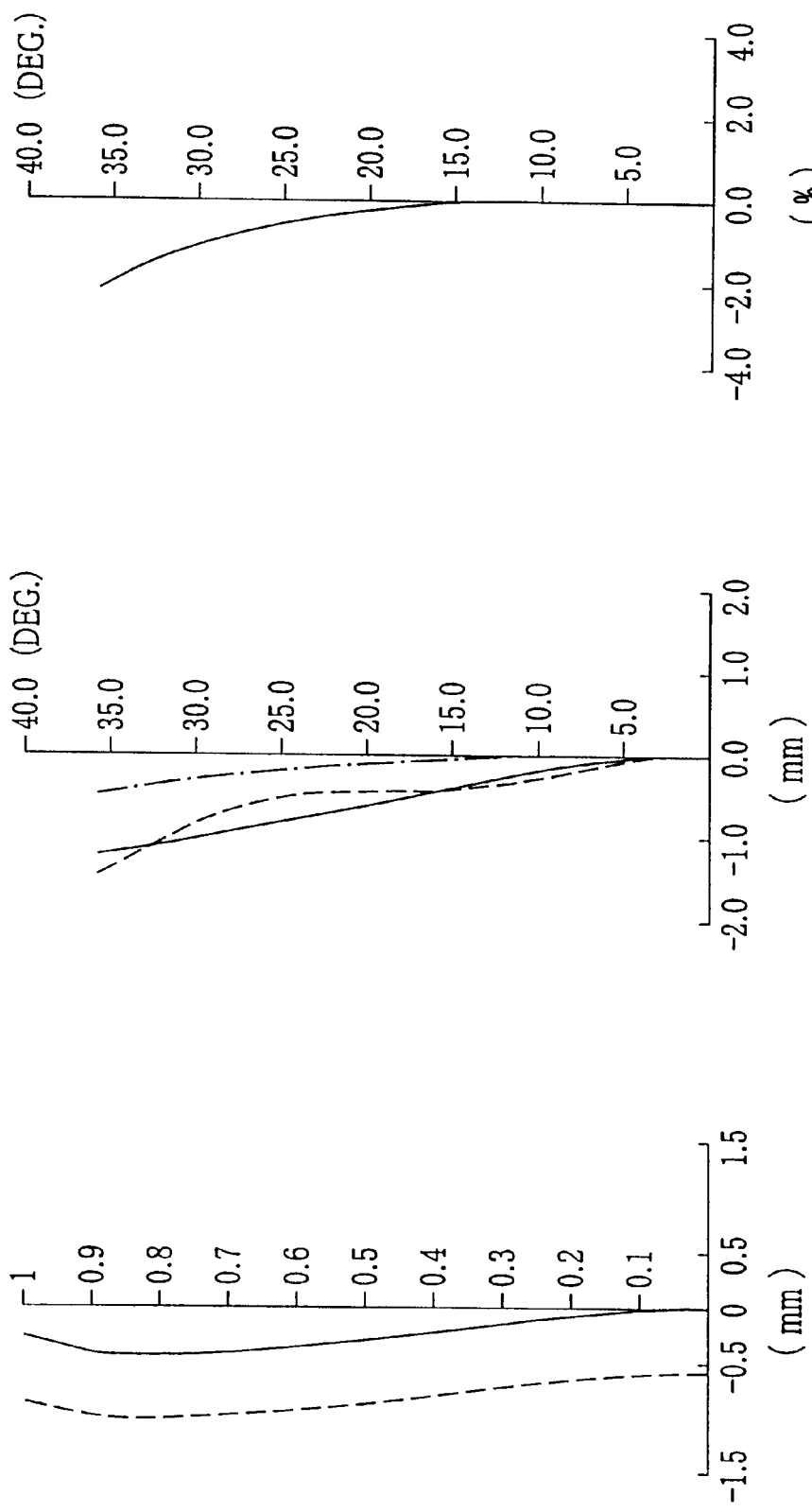
FIG. 11A SPHERICAL ABERRATION (mm)
FIG. 11B ASTIGMATISM (mm)
FIG. 11C DISTORTION (%)

LONGITUDINAL ABERRATION(0.35d)

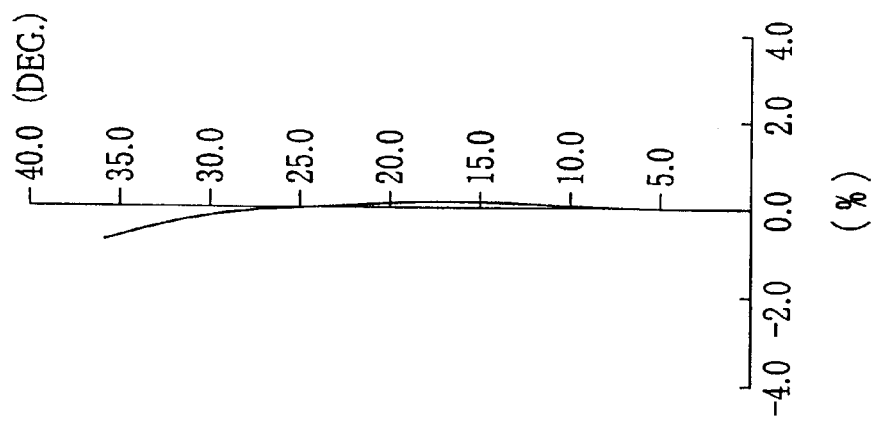
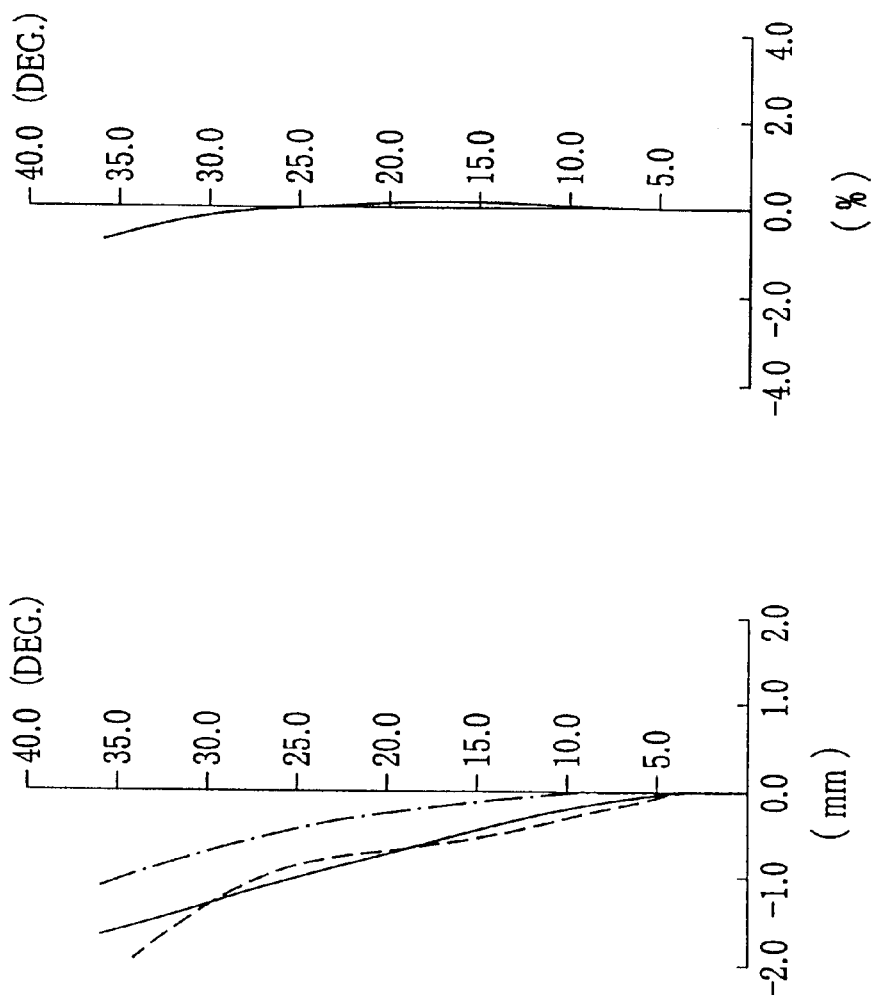
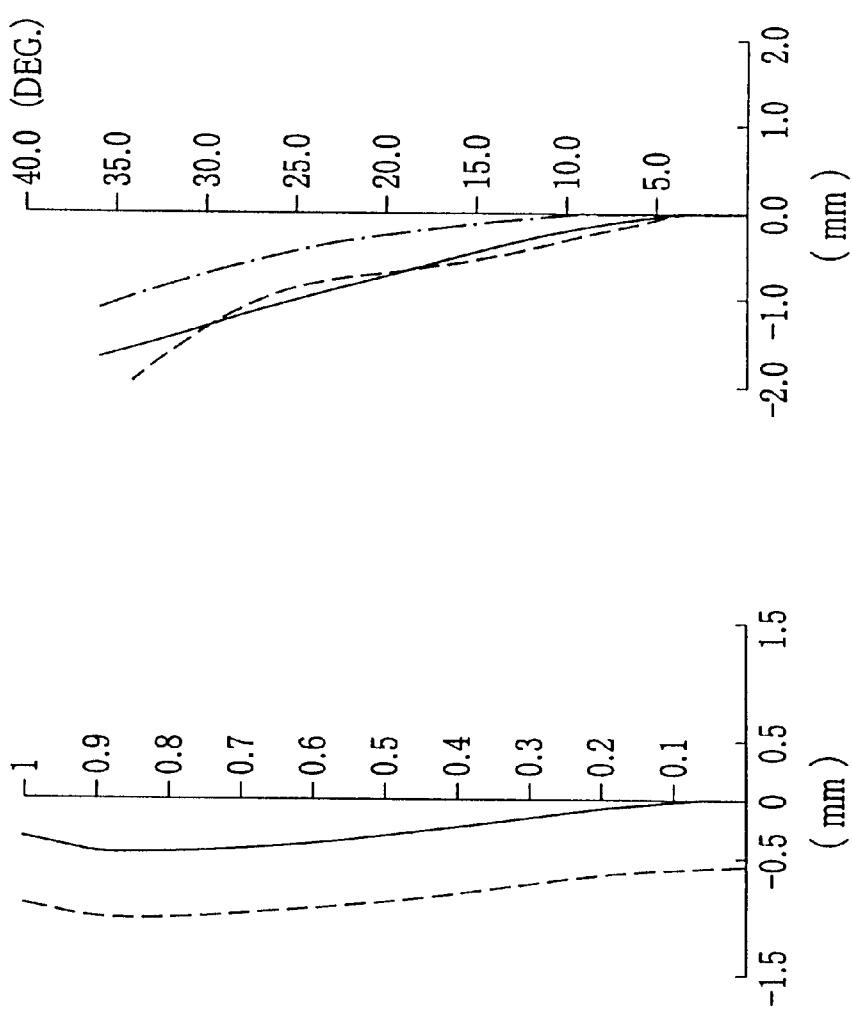

LONGITUDINAL ABERRATION(0.35d)

LONGITUDINAL ABERRATION(0.35d)

DISTORTION(%)

ASTIGMATISM(mm)

SPHERICAL ABERRATION (mm)

LONGITUDINAL ABERRATION(0.35d)

FIG. 23A SPHERICAL ABERRATION (mm)
FIG. 23B ASTIGMATISM (mm)
FIG. 23C DISTORTION (%)

LONGITUDINAL ABERRATION(0.35d)

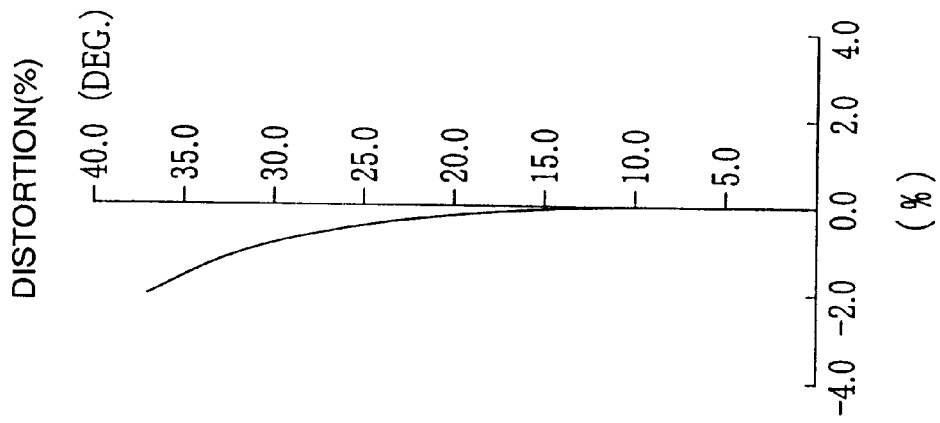
FIG. 26C DISTORTION(%)
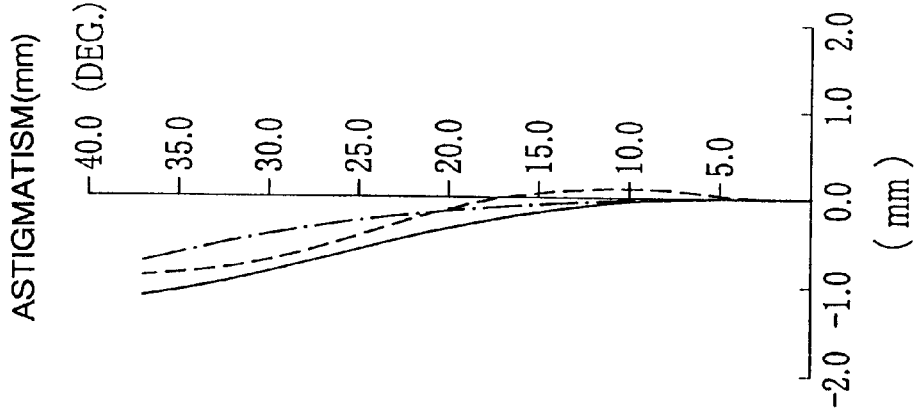
FIG. 26B ASTIGMATISM(mm)
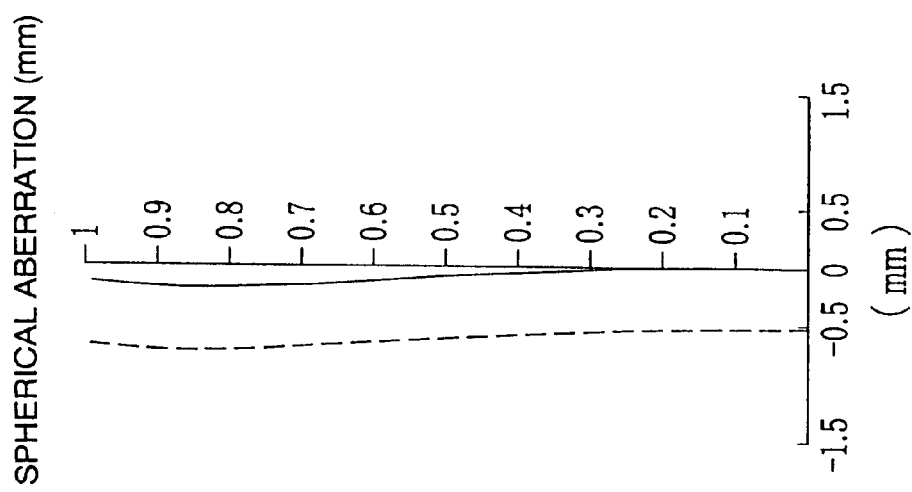
FIG. 26A SPHERICAL ABERRATION (mm)

LONGITUDINAL ABERRATION(0.35d)

LONGITUDINAL ABERRATION(0.35d)

LONGITUDINAL ABERRATION(0.35d)

TAKING LENS AND LENS-FITTED FILM UNIT EQUIPPED WITH THE TAKING LENS

BACKGROUND OF THE INVENTION

1. Field of the Invention

The present invention relates to a taking lens and a lens-fitted film unit equipped with the taking lens.

2. Description Related to the Prior Art

A variety of photographic cameras have been on the market according to uses and functions. Further, in recent years, lens-fitted film units have been popular for the purpose of easily enjoying photography without using ordinary photographic cameras. Such a lens-fitted film unit comprises a plastic light-tight unit casing with a taking lens, an exposure mechanism including a shutter and an unexposed filmstrip that is pre-loaded. This lens-fitted film unit makes the photographer take picture immediately after purchase thereof and, after exposure of the maximum number of exposures available on a filmstrip thereof, is simply given to a photofinisher for processing and making prints. This convenience has popularized widely the lens-fitted film unit. Because one of the important advantages of the lens-fitted film unit is a low price, it is essential to employ a simple structure. Taking lenses for use with the lens-fitted film units or low price photographic cameras generally comprise one or two lens elements. Such a taking lens comprising one or two lens elements is too poor in optical performance to provide a high quality image. On this grounds, in order to remove the curvature of field of the taking lens, the lens-fitted film unit is configured such as to support a filmstrip on an image surface curved in a lengthwise direction of the image frame of a filmstrip or a horizontal direction and having a center of curvature on the object side. On the other hand, thanks to remarkable progress in processing speed, an image processing technique has been established for reading an image directly from negatives by an image scanner, and improving contrast and the tone of color of the image and correcting various aberrations through digital image processing so as to provide a high quality image.

When exposing an exposure frame of a film placed on a curved image surface, while an image is somewhat prevented from being blurred due to the curvature of field of the taking lens, it is accompanied by emphasized distortion due to the curvature of the film. When the image surface curves in the lengthwise direction of the image frame, the distortion takes barrel-shaped distortion in the lengthwise direction. In order to remove such barrel-shaped distortion, it is necessary to provide a gently curved image surface, or otherwise to design the taking lens with the intention of causing it to produce positive distortion. When providing the image surface with gentle curvature, the distortion is somewhat restrained, which is however realized at the cost for the effect of improvement of an out-of-focus image that occurs due to the curvature of field of the taking lens. Further, when the taking lens comprises a single lens element and an aperture stop disposed on the object side of the lens element, it inevitably produces positive distortion with the effect of improving the above mentioned problem. However, when employing two lens elements for the taking lens with the intention to improve optical performance, distortion that the taking lens produces tends to become negative with improvement of marginal image quality and, in particular, a modulation transfer function (MTF). Accordingly, designing the two-lens element taking lens with the intention to cause the taking lens to produce positive distortion leads to an occurrence of a reduction in MTF at marginal portions of an image and aggravation of longitudinal chromatic aberration of magnification, so that the effect of the two-lens element taking lens is made feeble. When providing the taking lens with positive distortion, pincushion-shaped distortion occurs in a transverse direction of the image frame or a vertical direction which is perpendicular to the lengthwise direction of the image surface.

As described above, an image formed by the conventional taking lens is accompanied by aggravation of image quality due to a complex effect of various aberrations and a decrease in contrast. On the grounds, if the digital image processing to correct and improve the image quality, it is necessary to implement various image processing, which needs an ample of time.

SUMMARY OF THE INVENTION

It is accordingly an object of the present invention to provide a taking lens which forms an image most suitable for digital image processing.

It is another object of the present invention to provide a lens-fitted film unit equipped with a taking lens which forms an image most suitable for digital image processing.

The above objects of the present invention are achieved by a taking lens for forming an image on a filmstrip placed on an image surface which is curved in the lengthwise direction of the image frame of a filmstrip and has a center of curvature on the object end so as to correct the curvature of field for the taking lens in the image surface. The taking lens comprises in order from the object end to the image end a meniscus first lens element having a convex object side surface and a meniscus second lens element having a convex image side surface. Letting Ep, $\delta$ and Db be the axial distance between the curved image surface and an exit pupil of the taking lens which takes a value in mm greater than zero, the axial distance of opposite lengthwise ends of the curved image surface from the center of the curved image surface which takes a value in mm greater than zero, and the distortion which is equivalent but opposite in direction to distortion D occurring due to the curvature of image surface and given by $(\delta/Ep) \times 100\%$, respectively, the taking lens satisfies the following condition, $$-10\% \leq Ds \leq Db - 0.5\%$$

where

Ds is optical distortion in a plane including a paraxial focal point of light rays traveling from the exit pupil of the taking lens to a corners of the curved image surface.

The taking lens is desirably provided with an aperture stop disposed either on the image side of the meniscus second lens element or between the meniscus first lens element and the meniscus second lens element.

The taking lens preferably has aspheric surfaces at the convex object side surface of the meniscus first lens element and the convex image side surface of the meniscus second lens element. The aspheric surface may be defined by the following equation:

$$Z = ch^2/[1+\{1-(1+K)c^2h^2\}^{1/2}] + Ah^4 + Bh^6 + Ch^8 + Dh^{10}$$

where

Z is the surface sag at a semi-aperture distance h from the optical axis of the taking lens;

c is the curvature of a lens surface at the optical axis equal to the reciprocal of the radius at the optical axis;

K is a conic constant;

A, B, C and D are aspheric coefficients.

The taking lens is installed to a lens-fitted film unit which comprises a light-tight unit housing to which the taking lens is fixedly attached, a film cartridge with an unexposed filmstrip which is preloaded in the unit housing and is recorded, optically or magnetically, with data relating to distortion of the taking lens for the purpose of compensating distortion of an image formed on the filmstrip by the taking lens during digital image processing.

According to the present invention, the zoom lens is structured with the design intention to produce aggravation of image quality due only to distortion and is, however, free from or significantly improved in aggravation of other aberrations, so that the digital image processing is allowed to compensate only distortion of an image for improvement of image quality.

Before describing the present invention in detail, reference is made to FIG. 1 for the purpose of providing a brief background that will enhance an understanding of an occurrence of distortion.

As schematically shown in FIG. 1, a taking lens 60 that comprises a meniscus first lens element convex to the object side and a meniscus second lens element convex to the object side forming an image on an image surface, namely an image frame 64 of a filmstrip, with light rays from an exit pupil 63 of the taking lens 60. As is well known in the art, since image bearing light rays travels from the exit pupil of the taking lens to the image surface and converge on the image surface, if the image bearing light rays are focused on a point on the image surface off from the optical axis 60a of the taking lens 60, a magnification of image depends upon a distance between the exit pupil 63 and the image surface. Distortion of an image results from variations of the magnification of image. In order to compensate the distortion of the taking lens 60, the image surface is defined as a curved surface concave to the object side in the lengthwise direction of the image frame 64. In such a case, a point on the image surface comes progressively closer to the exit pupil 63 as the point is progressively apart farther from the optical axis 60a of the taking lens 60 in the lengthwise direction. That is, the distance of the image surface from the exit pupil 63 of the taking lens 60 is not constant in the lengthwise direction and varies depending upon a distance from the optical axis 60a of the taking lens 60 in the lengthwise direction, and, in consequence, the magnification of image varies depending upon a distance from the optical axis 60a of the taking lens 60 on the image surface. As a result, although the taking lens 60 is free from distortion and is sharply focused, successive points that make up a straight line in an object are refracted progressively closer to or farther from the optical axis 60a than their ideal positions with the result that imaged lines bend inward like the edges of a pincushion or outward like the sides of a barrel.

A ratio β between a magnification at a corner of the curved image surface on which the image frame 64 is placed and a magnification at a corner of a flat focal plane 65 which is an ideal image surface on which an image of an object at an infinite distance is focused by an aberration free the taking lens can be approximated by the following equation (I):

$$\beta = Y'/Y = \{(Ep-\delta) \times \tan\theta\}/(Ep \times \tan\theta) \quad (I)$$

where

Y is the distance at the corner of the flat focal plane 65 from the optical axis 60a of the taking lens 60;

Y' is the distance at the corner of the curved image surface from the optical axis 60a of the taking lens 60;

θ is a half angle of view of the taking lens.

The distortion D in % at the corner of the curved image surface that is cause due to curvature is given by the following equation (II):

$$D = (Y'-Y)/Y \times 100\% \quad (II)$$

The equation (II) is rewritten as follows:

$$D = -\delta/Ep \times 100\%$$

Since values Ep and δ take positive values, the distortion is always negative, which means a barrel-shaped distortion. In the case where a negative is provided from an image frame placed in a curved image surface during exposure and is placed in a flat plane during printing, the distance at the corner of the curved image surface from the optical axis 60a of the taking lens 60 should be converted to a distance of the corner when the image surface is developed to a flat surface, these distortion D and magnification ratio β can be obtained as approximate values by the use of the distance Y' at the corner of the curved image surface as mentioned above. Accordingly, when the taking lens 60 has the distortion Ds at the corner of the flat focal plane 65 including a paraxial focal point which is equivalent in value but opposite in direction to the distortion D at the corner of the curved image surface, namely Ds=-D, in other words, when the taking lens has positive distortion Ds, the taking lens 60 is prevented from producing a barrel-shaped distortion on the curved image surface.

On the other hand, though the image surface is curved as described above, a point on the image surface is stationary with respect to the exit pupil 63 independently from a shift of the point from the optical axis 60a of the taking lens 60 in a transverse direction (vertical direction) perpendicular to the lengthwise direction. That is, though a point on the curved image surface comes progressively closer to the exit pupil 63 with a variation of magnification as the point is progressively apart farther from the optical axis 60a of the taking lens 60 in the lengthwise direction, the change in the distance of the point from the exit pupil 63 is constant in the transverse direction, so that the curved image surface does not cause distortion of an image formed thereon in the transverse direction. Accordingly, the taking lens 60, which is designed with the intention to have the positive distortion Ds as describe above, produces pincushion-shaped distortion.

In consideration of the above discussions, distortion appearing on the curved image surface is balanced in both lengthwise and transverse directions by providing the taking lens 60 with distortion Ds which is slightly smaller than distortion Db which is equivalent to but opposite in direction to distortion D occurring due to the curvature of image surface. However, when providing the taking lens 60 with positive distortion Ds equivalent to the distortion Db focusing only on balancing distortion in the lengthwise and transverse directions, the taking lens 60 encounters aggravation of longitudinal chromatic aberration which causes a decrease in marginal contrast of the image. In the case of designing the taking lens 60 on condition that distortion accompanying the image is compensated through digital image processing, it is allowed to provide the taking lens with distortion Ds rather smaller than the distortion Db which occurs due to the curvature of image surface with the result of lowering the decrease in marginal contrast of the image due to aggravation of longitudinal chromatic aberration and, in consequence, making it possible to omit processing for improvement of marginal contrast of the image through the digital image processing. For this reason, the taking lens 60 is preferred to have distortion Ds equal to or less than distortion approximately 0.5% smaller than distortion Db that occurs due to the curvature of image surface and is suitable for balancing distortion in both lengthwise and transverse directions. On the other hand, if the taking lens 60 has distortion Ds smaller in excess than the distortion Db due to the curvature of image surface, the image at its marginal portions is enlarged at an increased ratio during processing for marginal contrast improvement, which results in aggravation of resolution of the image after digital image processing. For this reason, the taking lens 60 is preferred to have distortion Ds equal to or greater than (10%.

Data relating to the distortion Ds of the taking lens 60 is printed on the cartridge shell of the film cartridge, or otherwise may be recorded on a filmstrip in the cartridge that is pre-loaded in a lens-fitted film unit, optically or magnetically. The data is utilized to perform quick processing of compensation or removal of distortion appearing on an image formed by the taking lens during the digital image processing.

The taking lens is preferably equipped with an aperture stop which may be disposed either between the two component lens elements or behind the component lens element closer to the master image side.

BRIEF DESCRIPTION OF DRAWINGS

The above and other objects and features of the present invention will be more clearly understood from the following detailed description in connection with a preferred embodiment thereof when reading in conjunction with the accompanying drawings, in which:

FIG. 11A is an aberration diagram illustrating the curvature of field in which a solid line indicates an aberration for a d-line (wave length: 587.56 nm) and a broken line indicates an aberration for a g-line (wave length: 435.84 nm);

FIG. 11B is an aberration diagram illustrating astigmatism in which a solid line indicates astigmatism in a sagital image surface, a broken line indicates astigmatism in a tangential image surface, and a dotted line indicates a surface curve of the image surface in a diagonal direction;

FIG. 11C is an aberration diagram illustrating distortion;

FIG. 14A is an aberration diagram illustrating the curvature of field in which a solid line indicates an aberration for a d-line (wave length: 587.56 nm) and a broken line indicates an aberration for a g-line (wave length: 435.84 nm);

FIG. 14B is an aberration diagram illustrating astigmatism in which a solid line indicates astigmatism in a sagital image surface, a broken line indicates astigmatism in a tangential image surface, and a dotted line indicates a surface curve of the image surface in a diagonal direction;

FIG. 14C is an aberration diagram illustrating distortion;

FIG. 26A is an aberration diagram illustrating the curvature of field in which a solid line indicates an aberration for a d-line (wave length: 587.56 nm) and a broken line indicates an aberration for a g-line (wave length: 435.84 nm);

FIG. 26B is an aberration diagram illustrating astigmatism in which a solid line indicates astigmatism in a sagital image surface, a broken line indicates astigmatism in a tangential image surface, and a dotted line indicates a surface curve of the image surface in a diagonal direction;

FIG. 26C is an aberration diagram illustrating distortion;

DETAILED DESCRIPTION OF THE PREFERRED EMBODIMENTS

Figure 2:
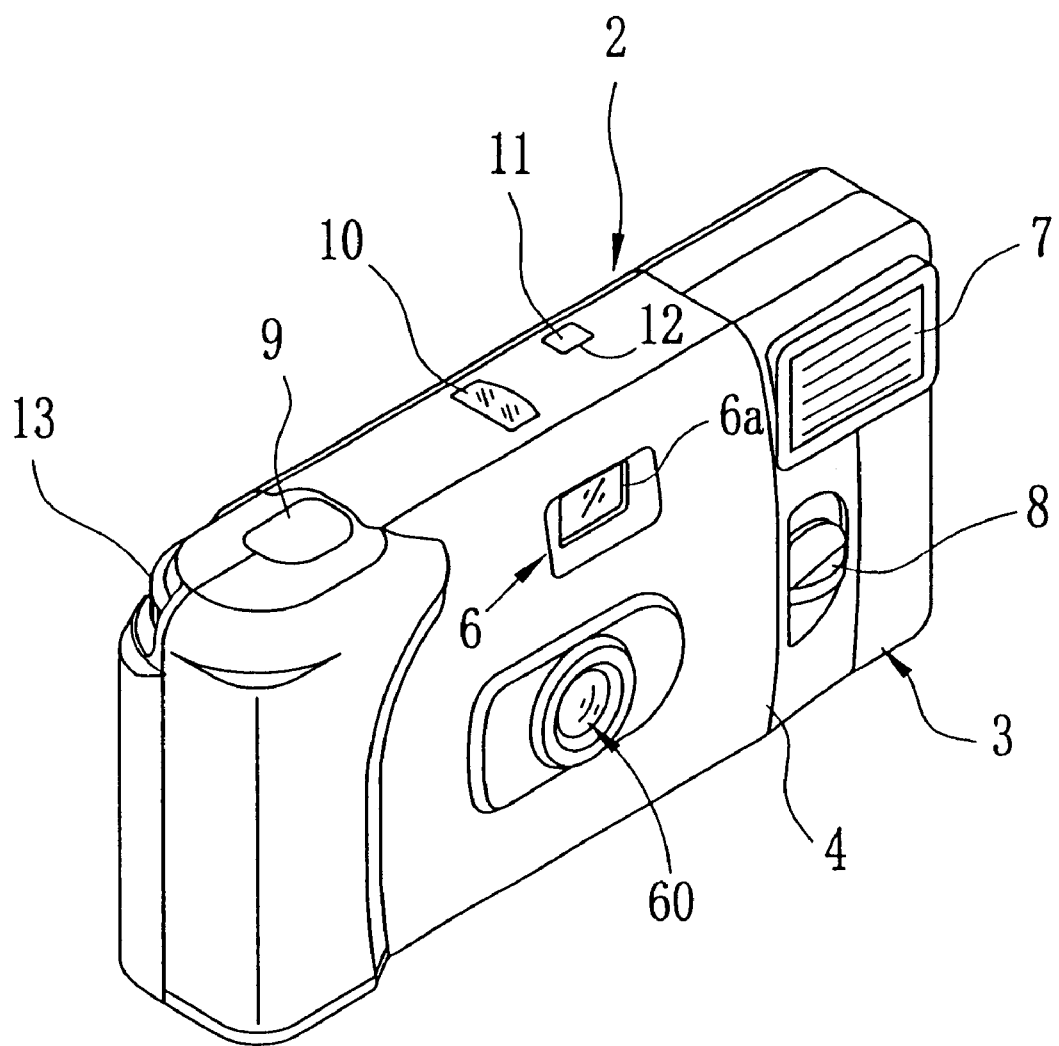
FIG. 2 is a perspective view of a lens-fitted film unit in accordance with a preferred embodiment of the present invention.

Referring to the drawings, and, in particular, to FIG. 2 which shows an outer appearance of a lens-fitted film unit 2 in accordance with a preferred embodiment of the present invention, the lens-fitted film unit 2 has a light-tight unit housing 3 pre-loaded with a film cartridge therein and covered by a decorative cardboard cover 4. The lens-fitted film unit 2 is provided with a taking lens 60, a window 6a in which an objective lens forming part of a view finder 6 is mounted, a built-in electronic flash unit 18 (see FIG. 3) and an electronic flash on-off switch 8 for turning on and off the electronic flash unit 18 which are arranged on a front wall of the unit housing 3, and further a shutter release button 9, a counter window 10 in which a number of available exposure is indicated and a window 12 through which a light guide member (not shown) projects to indicate completion of charging the electronic flash unit 18 which are arranged on a top wall of the unit housing 3. As seen in FIG. b3, the lens-fitted film unit 2 at the back is further provided with a film advance thumbwheel 13 of a film advancing mechanism for advancing an image frame after every exposure and a window 6b in which an eye piece lens 6b forming a part of the view finder 6 is mounted.

Figure 3:
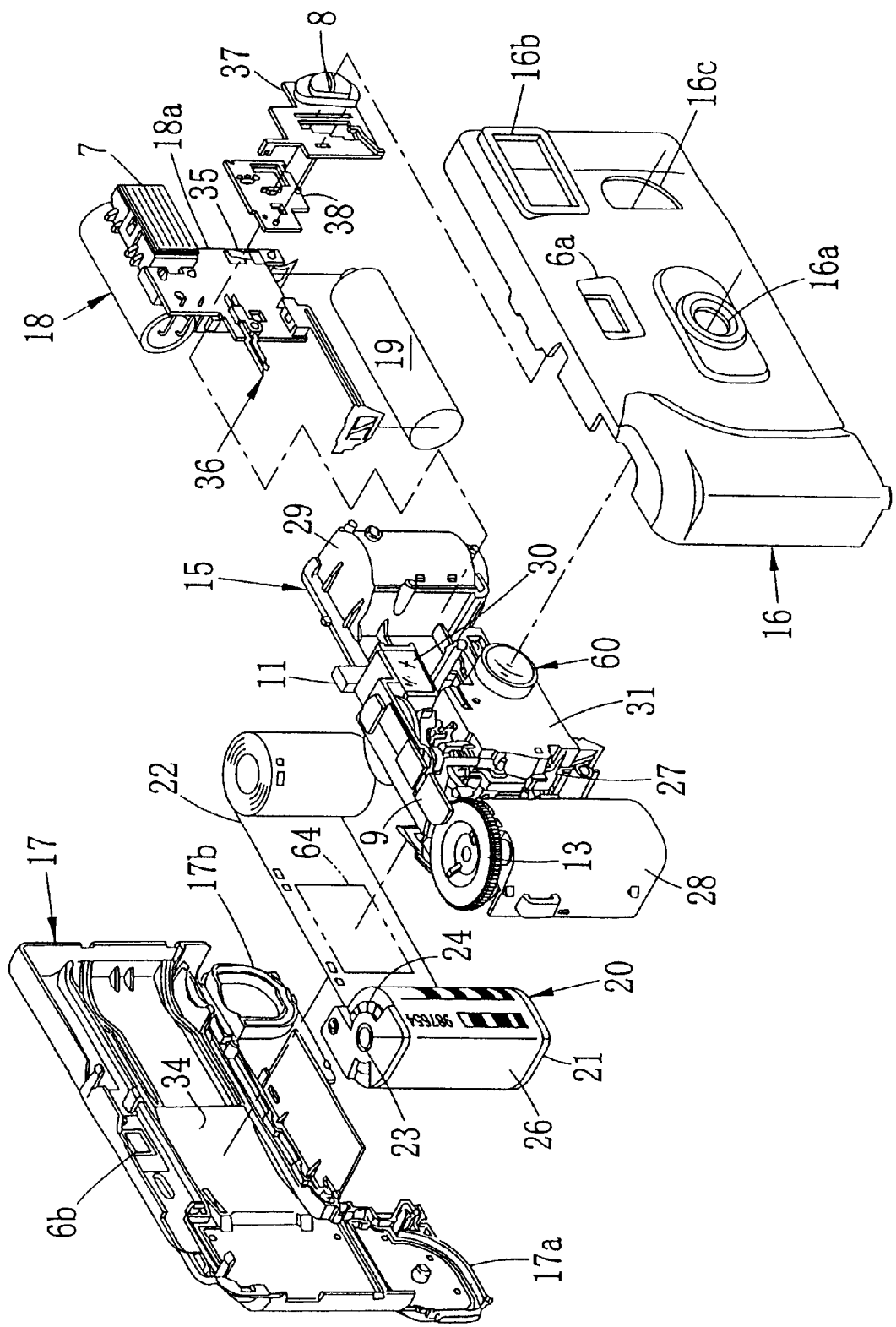
FIG. 3 is an exploded perspective view showing the interior structure of the lens-fitted film unit.

Referring to FIG. 3 showing details of the interior mechanism of the lens-fitted film unit 2, the light-tight unit housing 3 comprises two mating shell halves, namely front and rear covers 16 and 17 between which a main unit body 15 is light-tightly enclosed and is loaded with a battery 19 and a film cartridge 20. The film cartridge 20, which contains a type IX240 filmstrip for Advanced Photo System (APS), comprises a cartridge shell 21 and a filmstrip 22. The film cartridge 20 is factory loaded in the unit housing 3 and substantially the entire length of an unexposed filmstrip 22 is factory prewound into a roll. The cartridge shell 21 is provided with a spool 23 which is supported between top and bottom walls and rotatable therein and to which one end of the filmstrip 22 is secured, a data disk 24 which is secured to one end of the spool and partly seen from the outside, a filmstrip unwinding mechanism for rotating the spool 23 to unwind the filmstrip off the spool 23 and advance it out of the cartridge shell 21, and a light block door 25 (see FIG. 5) operative to open and close a film egress/ingress slot. The film cartridge 22 has a label 26 attached to the cartridge shell 21. As will be described in detail later, data relating to distortion are recorded on the label 26.

The main unit body 15 is provided with an integral exposure chamber 27 at its front center which forms a dark passage between the taking lens 60 and the filmstrip 22 and a cartridge chamber 28 for receiving the film cartridge 21 and a film roll chamber 29 for receiving a roll of the filmstrip 22 which are disposed on opposite sides of the exposure chamber 27. The exposure chamber 27 is fixedly provided with the light guide member 11, a lens 30 forming a part of the view finder 6, a shutter unit cover 31 and the taking lens 60 in addition to a shutter unit including a shutter blade and a shutter drive mechanism for driving the shutter blade in response to operation of the shutter button 9 and an exposure counter mechanism which are known in various forms and may take any known form. The exposure chamber 27 at its back forms an exposure aperture which is long from side to side in a lengthwise direction and has an APS format of standard frame size (16.7×30.2 mm). The film advance thumbwheel 13 disposed for rotation above the cartridge chamber 28 is formed integrally with a drive shaft which is in engagement with one of opposite ends of the spool 23 of the film cartridge 20 so as to rewind an exposed frame of the filmstrip 22 into the cartridge shell 21 and concurrently place an unexposed frame of the filmstrip 22 in the exposure aperture. There is provided between the cartridge chamber 28 and the film advance thumbwheel 13 a light block door drive mechanism (not shown) for rotating the light block door 25 to close the film egress/ingress slot when all of the available exposure frames are exposed and rewound into the cartridge shell 21.

The front cover 16 is formed with windows or openings 6a, 16a, 16b and 16c for the finder objective lens 30, the taking lens 60, a diffusion plate 7 of the electronic flash unit 18, and the electronic flash on-off switch 8, respectively. The rear cover 17 is provided with bottom lids 17a and 17b as integral parts for closing bottom openings of the cartridge chamber 28 and the film roll chamber 29, respectively. After loading the film cartridge 20 into the cartridge chamber 28, the rear cover 17 is attached to the main unit body 15 and then the cartridge chamber 28 and the film roll chamber 29 are light-tightly closed by the bottom lids 17a and 17b, respectively. These bottom lid 17a is opened for removal of the film cartridge 20 containing exposed filmstrip therein at a photofinisher. As seen in FIG. 3, the rear cover 17 is formed with a film support surface 34 which faces the exposure aperture so as to form a thin film path behind the exposure chamber 27 between the cartridge chamber 28 and the film roll chamber 29. The film support surface 34 is shaped concave to the exposure aperture so as to form a concave film path and accompanied by guide rails (not shown) extending along opposite sides of the concave film path. The filmstrip 22, in particular an exposure frame 64, placed in the film path defined by the concave film support surface 34 and guided by the guide rails is in a curved image surface with center at a point on an object side, which provides a correction of curvature of image produced by the taking lens 60.

The built-in electronic flash unit 18 includes a printed-circuit board 18a on which an electronic flash circuit and various electric parts are printed or secured, a discharge tube and a reflector which are disposed behind the diffusion plate 7, a switch board 37 on which a switch 35 and a synchronous switch 36 are arranged in addition to the electronic flash on-off switch 8, and a support board 38 for supporting the switch board 37 for slide movement. The electronic flash unit 18 is electrically charged from the battery 19. Pushing up the electronic flash on-off switch 8 causes the switch 35 to turn on so as to start charging the electronic flash unit 18 and place it ready for trigger. When the shutter is released, the synchronous switch 37 is turned on to trigger the electronic flash so as to make a flash.

Figure 1:
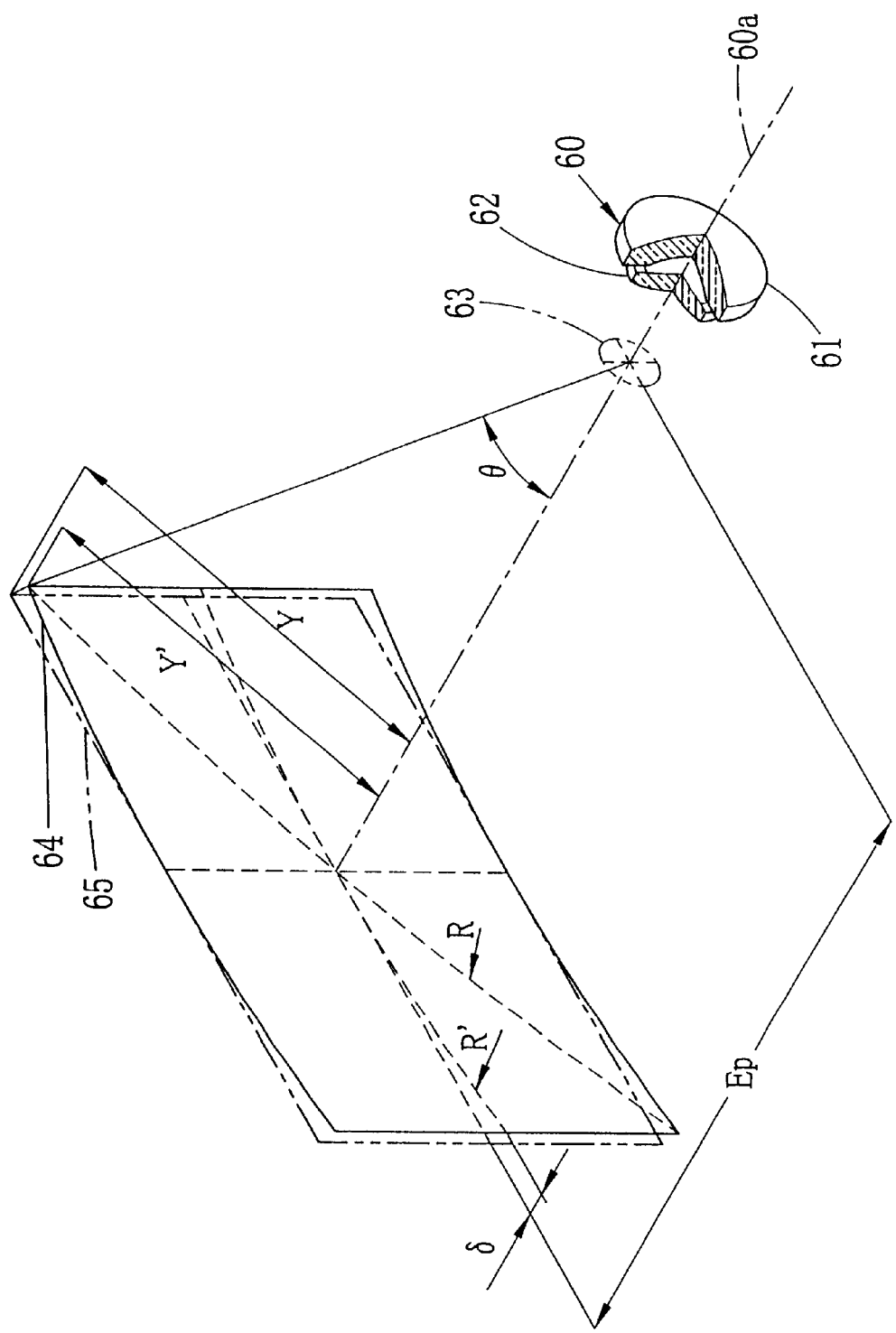
FIG. 1 is a diagram explaining the optical relationship between an image surface and a taking lens of the present invention.
Figure 4:
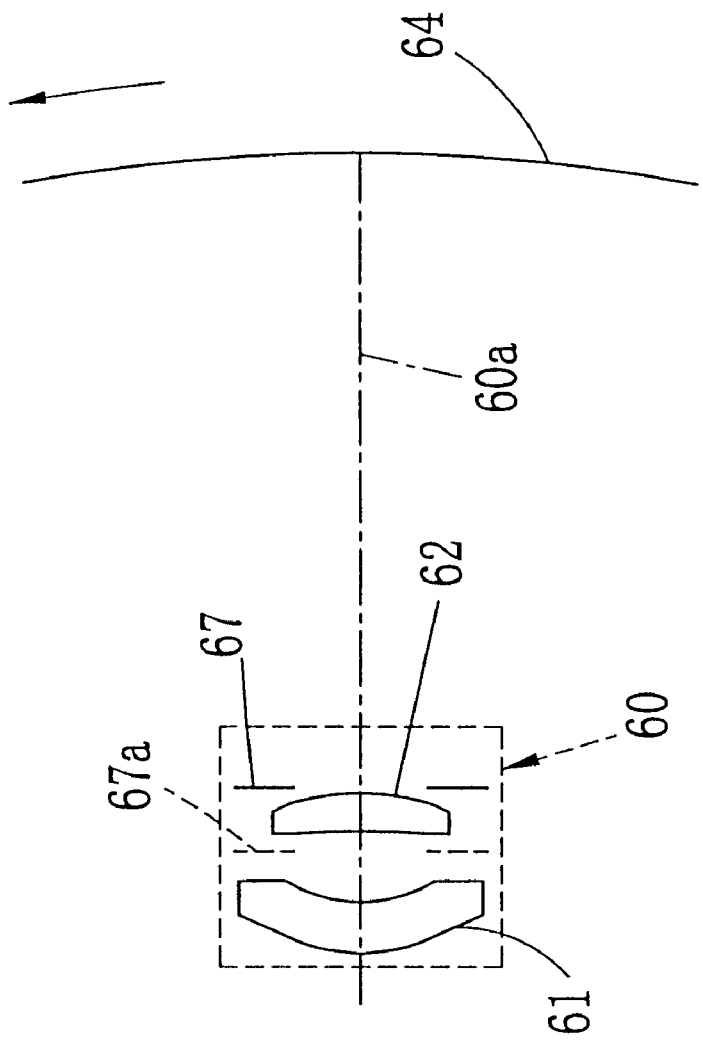
FIG. 4 shows a side elevation of a taking lens in accordance of the present invention.

As schematically shown in FIG. 4, the taking lens 60 comprises a meniscus first lens element 61 having a convex object side surface, a meniscus second lens element 62 having a convex object side surface and an aperture stop 67 arranged in order from the object end and forms a focused image on an exposure frame 64 of the filmstrip 22 supported on the concave film support surface 34 of the rear cover 17. The aperture stop 67 may be disposed between the first and second lens elements 61 and 62 as indicated by a reference 67a. As shown in FIG. 1, letting the axial distance between the convex surface of exposure frame 64 and the exit pupil 63 of the taking lens 60, the axial distance of the opposite lengthwise ends of the convex surface of exposure frame 64 from the center of the of the convex surface of exposure frame 64 and the optical distortion in a plane including a paraxial focal point of light rays traveling from the exit pupil 63 to a corners of the exposure frame be Ep in mm, δ in mm, and Ds in %, respectively, the taking lens 60 satisfies the given conditions:

$$-10\% \leq Ds \leq Db - 0.5\%$$

where $$Db = (\delta/Ep \times 100\%, \delta > 0 \text{ and } Ep > 0.$$

Figure 5:
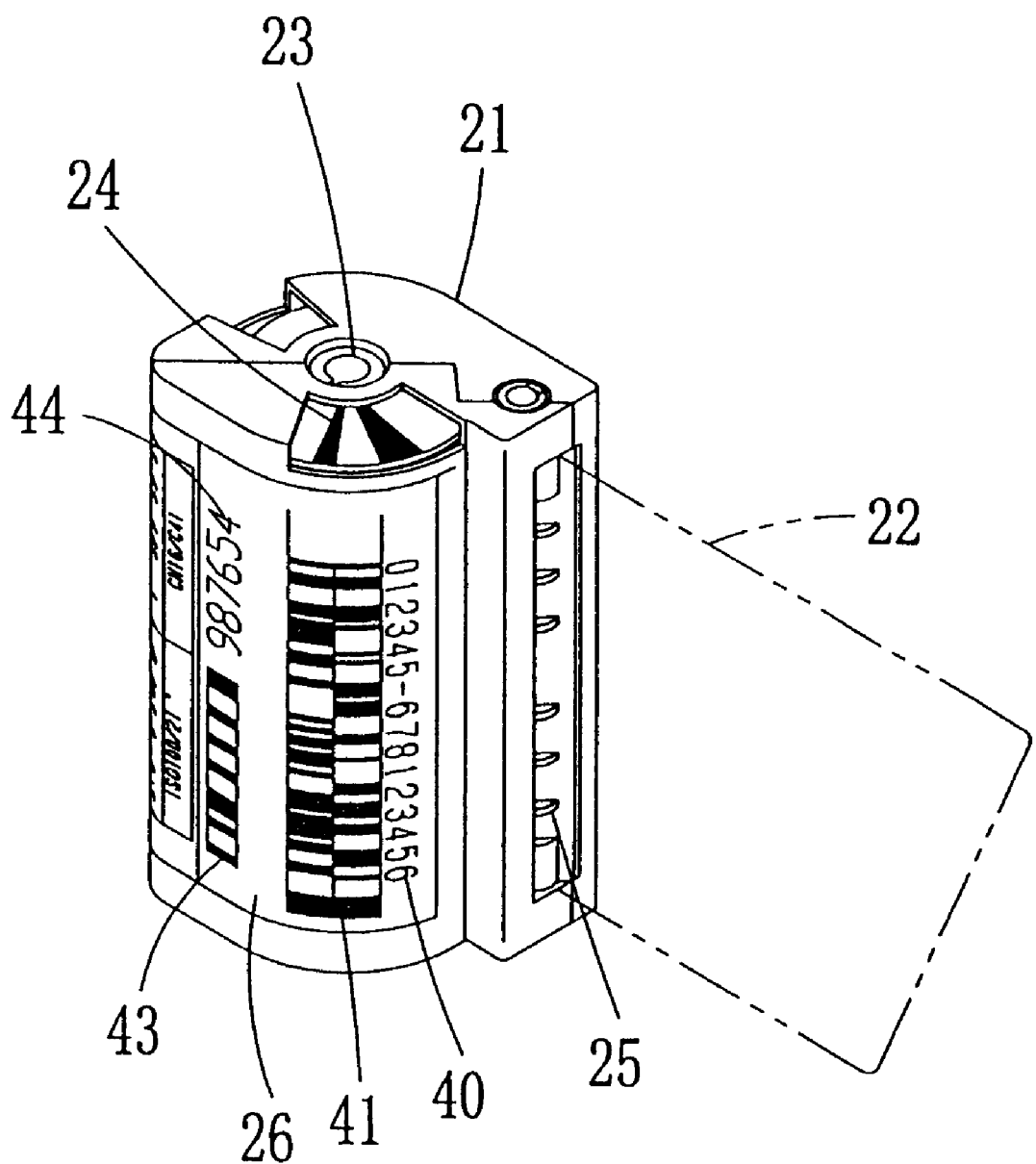
FIG. 5 is a perspective view showing an outer appearance of a film cartridge.

Referring to FIG. 5 which shows an outer appearance of the film cartridge 20 in detail, as was previously described, the type IX240 film cartridge 20 comprises the cartridge shell 21 and the filmstrip 22. The cartridge shell 21 incorporates the rotatable spool 23, the data disk 24 and the light block door 25 and is attached with the label 26. The data disk 24, on which a bar code is printed thereon to represent data relating the filmstrip 22 such as a number of exposed frames or a number of exposures still available on the filmstrip 22, a film speed and the like, is rotatable together with the spool 23. The data on the data disk are read by a bar code reader equipped in a camera with the film cartridge 20 is loaded or a bar code reader equipped in a printer for processing the filmstrip 22 contained in the film cartridge 20. The label 26 carries a type of photographic emulsion of the filmstrip 22, a film speed, an maximum number of exposures available on the filmstrip 22 and a bar code 41 and a numeral code 40 that identifies the film cartridge 20. The bar code 41 is read by a handy type bar code reader or a fixed type bar code reader when processing the filmstrip 22 and making prints from the filmstrip 22. The numeral code 40 is used to visually identify the film cartridge 20 in the case where no bar code reader is available. The film cartridge 20 is provided not only for use with the lens-fitted film units but also for use with a conventional camera. Accordingly, the label 26 for use with the lens-fitted film unit carries data relating to distortion which is information necessary to make a correction of distortion produced on the image surface of the taking lens 60. In this embodiment, numbers are assigned as distortion data to types of distortion. Functions and parameters for distortion correction corresponding to the distortion data are entered in a digital image processor. The same number is applied as distortion data to the same type of distortion in spite of types of lens-fitted film units but different numbers are applied as distortion data to the same type of lens-fitted film units if the type of distortion is different due to optical characteristics of taking lenses and/or radii of curvatures of the image surfaces. The distortion data is printed in the form of bar code 43 and numeral code 44 on the label 26. When making prints from the filmstrip 22 contained in the film cartridge 20 with the label 26, the digital image processor reads in the bar code 43 or numeral code 44 as distortion data and implements a process of distortion correction using a function and parameters corresponding to the distortion data, so as to form an image without distortion. In this process, functions and parameters for distortion correction can be calculated on the basis of characteristics of the taking lens and a radius of curvature of the image surface.

Figure 6:
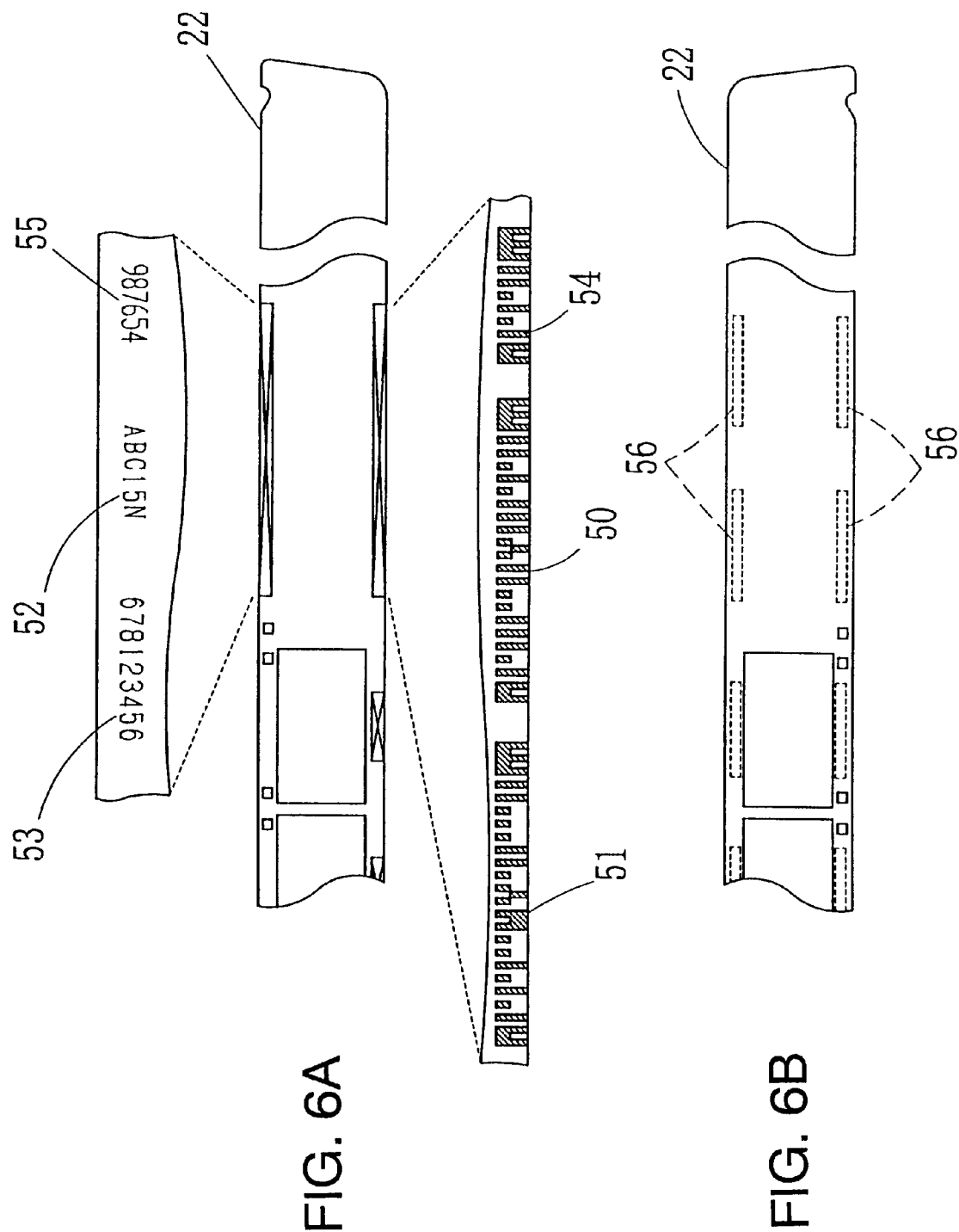
FIG. 6 is an explanatory view illustrating data printed or magnetically recorded on a filmstrip.

The bar code 43 is read by a handy type bar code reader or a fixed type bar code reader, and the numeral code 44 is read by an optical character reader, or otherwise used to manually enter the distortion data of the film cartridge 20 in the case where no optical character reader can not be available. The distortion data may be recorded on the film cartridge 20 in another manner. For example, correction parameters may be employed as distortion data and recorded in the form of stack-type bar code or the matrix-type bar code on the label 26. Further, the distortion data may be stored in an IC memory incorporated in the film cartridge 20 or recorded on the data disk 24. In place of employing the label 26, the distortion data can be recorded on the filmstrip 22. As shown in FIG. 6A, at the manufacturer, various data including the type of film, bar codes 50 and 51 and numeral codes 52 and 53 for identifying the filmstrip 22 are recorded as latent image on the filmstrip 22 and developed as visual images. Otherwise, a bar code 54 and a numeral code 55 may be printed as visual images on opposite side margins of the filmstrip 22 and read when making prints. In particular, as shown in FIG. 6B, in the case of using a type IX240 filmstrip for Advanced Photo System (APS), the distortion data can be recorded on a magnetic recording tracks 56 on the back surface of the filmstrip 22 as well as exposure data, a type of film, an ID number of the filmstrip, laboratory data for making prints and the like. Because a lens-fitted film unit for which the film cartridge 22 is to be loaded can be identified on the basis of the bar code 41 or 50 or the numeral code 40 or 52, these data may be used as distortion data.

At the manufacturer, a label 26 carrying a bar code 43 and a numeral code 44 representative distortion data peculiar to a specific lens-fitted film unit 2 is attached to a film cartridge 20 that is to be loaded into the specific lens-fitted film unit 2. After loading the main unit body 3 of the specific lens-fitted film unit 2 with this film cartridge 20, the main unit body 3 is fixedly covered by the front and rear covers 16 and 17 and then by the decorative cardboard cover 4. The lens-fitted film unit 2 is completed by prewound substantially the entire length of the unexposed filmstrip 22 from the cartridge shell 21 into simply a roll in the film roll chamber 29. When a photographer who has purchased the lens-fitted film unit 2 intends to take pictures, the photographer first operates the film advance thumbwheel 13 to rewind the filmstrip 22 by one frame and charge the shutter drive mechanism before making an exposure. After, if necessary, charging up the electronic flash by operating the electronic flash on-off switch 8, the shutter button 9 is depressed aiming an object through the view finder 6 to open the shutter. Light rays from the scene are focused on an exposure frame 64 of the filmstrip 22 placed in the image surface by the taking lens 60 to expose the exposure frame 64. After having exposed all of the exposures available on the filmstrip 22, the filmstrip 22 is completely rewound into the cartridge shell 21 by continuously operating the film advance thumbwheel 13. Thereafter, the lens-fitted film unit 2 is given to a photofinisher who first removes the film cartridge 20 with the exposed filmstrip 22 from the unit. After removing the exposed filmstrip 22 from the cartridge shell 21 and developing the negatives, the negative filmstrip 22 is packed in the same cartridge shell 21 for making prints by a digital printing machine having an image scanner and a digital image processor. When the film cartridge 20 is put in a digital printing machine, the digital printing machine withdraws the filmstrip 22 from the cartridge shell 21 to place the first negative in a scanning position thereof and makes a print from the first negative.

Figure 7:
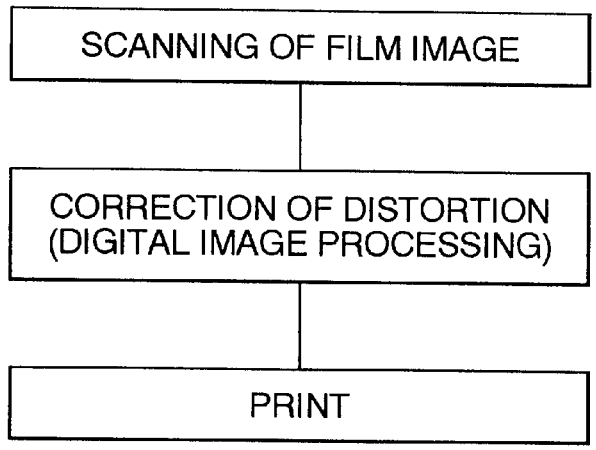
FIG. 7 is a flow chart illustrating a sequence routine of making prints.

Referring to FIG. 7 which is a flow chart illustrating a sequence routine of printing process, when the sequence logic start, after reading the bar code 43 on the label 26 of the film cartridge 20 as distortion data, the image scanner scans the negatives one after another and converts the image into digital signals for three primary color images. The digital image processor implements a distortion correction in the image by the use of a correction function and parameters corresponding to the distortion data. Three primary color image data of the image after the distortion correction are sent to a printing station of the digital printing machine to make an exposure on a long web of photographic paper. The exposure is controlled by adjusting amounts of, for example, red, green and blue lasers according to the image data, respectively. The exposed photographic paper is transported to an automatic processing station for development, fixing and drying and thereafter to a cutting station for cutting the photographic paper into individual prints. The picture on the print is free from distortion that is produced by the taking lens 60 and/or the curved surface of the exposure frame 64. The taking lens 60 is designed to have optical characteristics satisfactorily corrected in aberrations other than distortion, so that it is not necessary to make other corrections in order to provide a high quality image.

Figure 8:
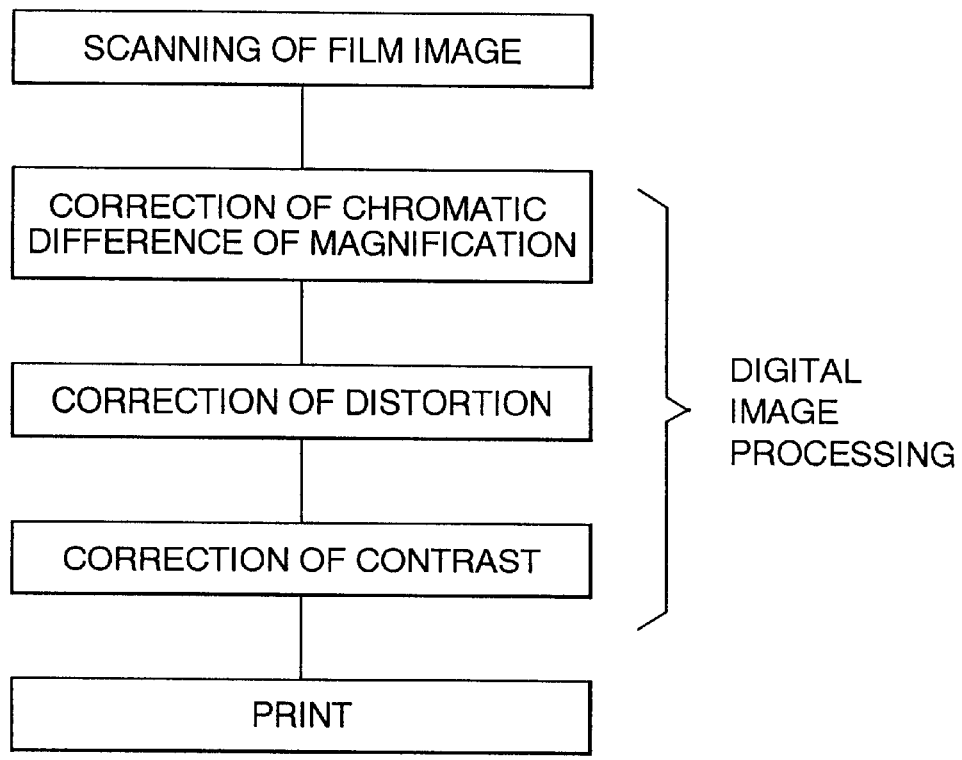
FIG. 8 is a flow chart illustrating a conventional sequence routine of making prints

For providing a high quality image from a negative of a filmstrip exposed through a conventional taking lens, corrections must be made in the digital image processing in order to remove longitudinal chromatic aberration (a chromatic difference of magnification) and regulate contrast in addition to removal of distortion through a printing process, a sequence routine of which is illustrated by a flow chart shown in FIG. 8 by way of example and which needs a relatively long processing time. By contrast, the image processing of an image of the negative made from the filmstrip 22 exposed through the taking lens 60 is completed in a short time because correction is made to remove distortion only. While the distortion correction can be made for the three primary color images all at once, because the longitudinal chromatic aberration occurs due to a difference among magnifications of the respective color images, a correction of the longitudinal chromatic aberration must be made separately for the respective color images. Accordingly, a time necessary to make an image correction is significantly shorter for an image of the filmstrip 22 exposed by the taking lens 60 than that for an image of a filmstrip that is exposed by the conventional taking lens.

The following description will be directed to various examples of the taking lens of the invention which are shown in FIGS. 12 through 33. In the examples, the taking lens comprises, in order from the object end, a meniscus first lens element 61 (L1) having a convex aspheric object side surface and a meniscus second lens element 62 (L2) having a convex aspheric image side surface. The aspheric surface may be defined by the following equation:

$$Z = ch^2/[1+\{1-(1+K)c^2h^2\}^{1/2}] + Ah^4 + Bh^6 + Ch^8 + Dh^{10}$$

where

Z is the surface sag at a semi-aperture distance h from the optical axis of the taking lens;

c is the curvature of a lens surface at the optical axis equal to the reciprocal of the radius at the optical axis;

K is a conic constant;

A, B, C and D are aspheric coefficients.

The following tables, various examples of the taking lens are set forth with parameters of the invention. In the following prescription tables, the reference L followed by an arabic numeral indicates the lens surface progressively from the object end to the image end of the taking lens. The reference radius numbers R are the progressive surface radii of lens elements and other optical elements. Positive surface radii are struck from the right of the lens surface on the optical axis. Negative surface radii are struck from the left of the lens surface on the optical axis. Nd is the index of refraction of the lens element. νd is the dispersion of the lens element as measured by the Abbe number. θ is a half angle of view. As was previously mentioned, parameters Ep, δ and Ds indicate the axial distance between the convex surface of exposure frame 64 and the exit pupil 63 of the taking lens 60, the axial distance of the opposite lengthwise ends of the convex surface of exposure frame 64 from the center of the of the convex surface of exposure frame 64 and the optical distortion in a plane including a paraxial focal point of light rays traveling from the exit pupil 63 to a corners of the exposure frame, respectively. Further, Db is given by (δ/Ep)×100%. An asterisk in parentheses indicates an asphric surface. The radius of curvature of an image surface is represented by a radius of curvature of the exposure frame in a diagonal direction R to which a radius of curvature R' of the exposure frame in the lengthwise direction as shown in FIG. 1.

Figure 9:
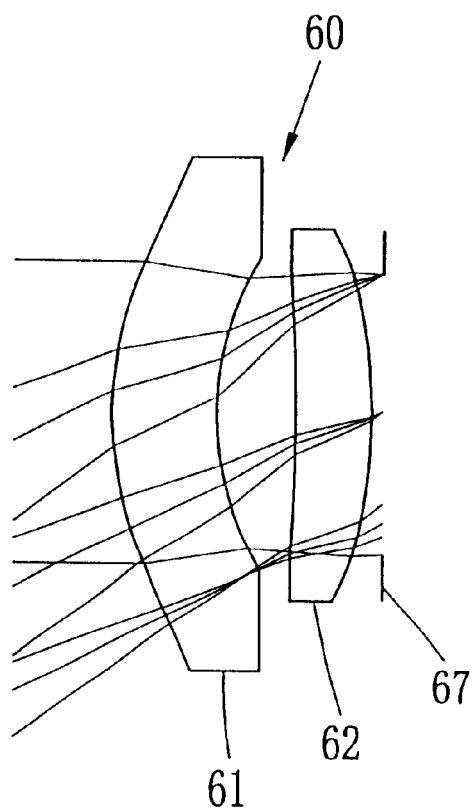
FIG. 9 shows a side elevation of a taking lens in accordance with an embodiment of the present invention.
Figure 10:
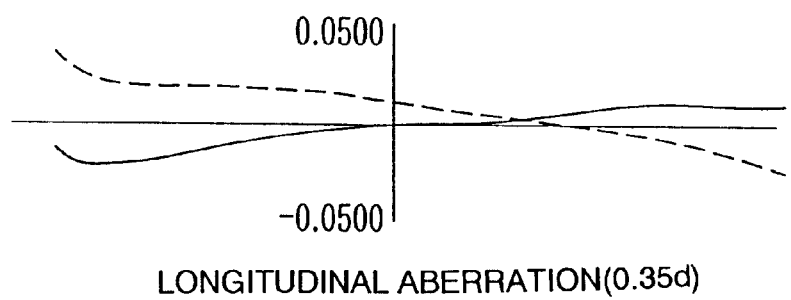
FIG. 10 is an aberration diagram illustrating lateral aberrations at an image height of 0.35 d (1 d is a diagonal length of the image frame) in which a solid line indicates a lateral aberration for a d-line (wave length: 587.56 nm) and a broken line indicates a lateral aberration for a g-line (wave length: 435.84 nm)

A taking lens shown in FIG. 9 scaled to an image frame of 16.7×30.2 mm and a relative aperture of f/8 is substantially described in table I.

TABLE I

| Lens Surface | Radius of Curvature (mm) | Axial Distance Between Surfaces (mm) | Nd | νd |
|---|---|---|---|---|
| L1 | R1 = 3.423(*) | | | |
| | | D1 = 1.03 | 1.492 | 57.5 |
| L2 | R2 = 2.743 | | | |
| | | D2 = 0.81 | | |
| L3 | R3 = −16.853 | | | |
| | | D3 = 0.75 | 1.492 | 57.5 |
| L4 | R4 = −5.309(*) | | | |
| | | D4 = 0.10 | | |
| Aperture Stop | R5 = ∞ | | | |
| | | D5 = 22.00 | | |
| Image Surface | R6 = −238.4 | | | |

Aspheric Surfaces: L1 and L4

| Aspheric Coefficients: | L1 | L4 |
|---|---|---|
| A | −4.02489E−3 | 2.98038E−4 |
| B | −1.23836E−3 | −3.33950E−4 |
| C | 1.22878E−4 | 0.0 |
| D | −4.24390E−5 | 0.0 |

TABLE I-continued

| Conic Constant: | | |
|---|---|---|
| K | 0.753348 | 4.437785 |

Parameters:

| f (mm) | f1 (mm) | f2 (mm) | θ (°) | Ep (mm) | δ (mm) | Db (%) | Ds (%) |
|---|---|---|---|---|---|---|---|
| 23.58 | −56.39 | 15.42 | 5.84 | 22.00 | 0.52 | 2.36 | −2.194 |

In Table I, D5 indicates an axial distance between the aperture stop and the paraxial focal point.

As apparent, the taking lens shown in FIG. 9 satisfies the given condition.

FIGS. 10 and 11A to 11C show lateral aberrations at an image height of 0.35 d (1 d is a diagonal length of the image frame), the curvature of field, astigmatism, and distortion, respectively. In FIGS. 9 and 10A, a solid curve indicates an aberration for a d-line (wave length: 587.56 nm), and a broken curve indicates an aberration for a g-line (wave length: 435.84 nm). In FIG. 10B, a solid curve indicates an aberration in a sagital image surface, and a broken curve indicates a tangential image surface, and further a dotted line indicates a curve of the image surface in a diagonal direction.

Figure 12:
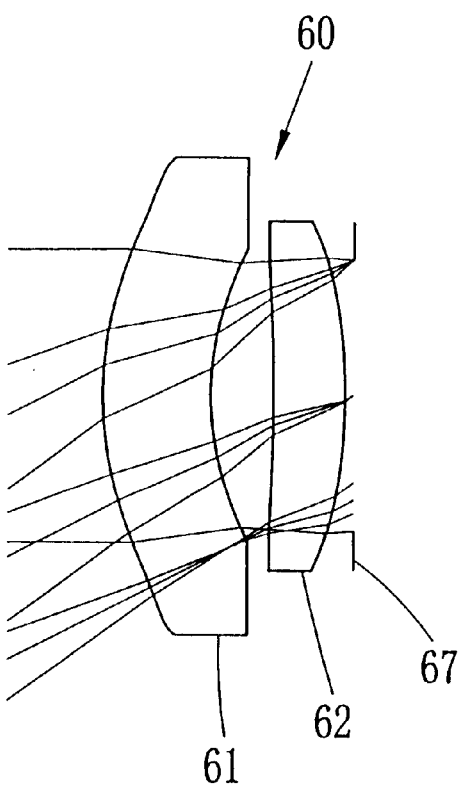
FIG. 12 shows a side elevation of a taking lens in accordance with another embodiment of the present invention.

A taking lens shown in FIG. 12 scaled to an image frame of 16.7×30.2 mm and a relative aperture of f/8.0 is substantially described in table II.

TABLE II

| Lens Surface | Radius of Curvature (mm) | Axial Distance Between Surfaces (mm) | Nd | νd |
|---|---|---|---|---|
| L1 | R1 = 3.753(*) | | | |
| | | D1 = 1.11 | 1.492 | 57.5 |
| L2 | R2 = 2.996 | | | |
| | | D2 = 0.67 | | |
| L3 | R3 = −22.590 | | | |
| | | D3 = 0.75 | 1.492 | 57.5 |
| L4 | R4 = −5.833(*) | | | |
| | | D4 = 0.10 | | |
| Aperture Stop | R5 = ∞ | | | |
| | | D5 = 22.28 | | |
| Image Surface | R6 = −105.0 | | | |

Aspheric Surfaces: L1 and L4

| Aspheric Coefficients: | L1 | L4 |
|---|---|---|
| A | −4.52344E−3 | −1.37877E−4 |
| B | −1.27221E−3 | −3.15730E−4 |
| C | 1.41403E−4 | 0.0 |
| D | −4.36187E−5 | 0.0 |

| Conic Constant: | | |
|---|---|---|
| K | 1.229305 | 5.214633 |

Parameters:

| f (mm) | f1 (mm) | f2 (mm) | θ (°) | Ep (mm) | δ (mm) | Db (%) | Ds (%) |
|---|---|---|---|---|---|---|---|
| 24.00 | −58.54 | 15.75 | 35.51 | 22.28 | 1.17 | 5.25 | −0.79 |

In Table II, D5 indicates an axial distance between the aperture stop and the paraxial focal point.

As apparent, the taking lens shown in FIG. 12 satisfies the given condition.

Figure 13:
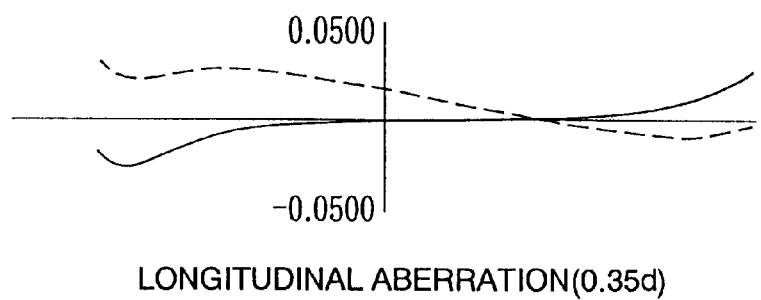
FIG. 13 is an aberration diagram illustrating lateral aberrations at an image height of 0.35 d (1 d is a diagonal length of the image frame) in which a solid line indicates a lateral aberration for a d-line (wave length: 587.56 nm) and a broken line indicates a lateral aberration for a g-line (wave length: 435.84 nm)

FIGS. 13 and 14A to 14C show lateral aberrations at an image height of 0.35 d, the curvature of field, astigmatism, and distortion, respectively. In FIGS. 13 and 14A, a solid curve indicates an aberration for a d-line (wave length:

587.56 nm), and a broken curve indicates an aberration for a g-line (wave length: 435.84 nm). In FIG. 14B, a solid curve indicates an aberration in a sagital image surface, and a broken curve indicates a tangential image surface, and further a dotted line indicates a curve of the image surface in a diagonal direction.

Figure 15:
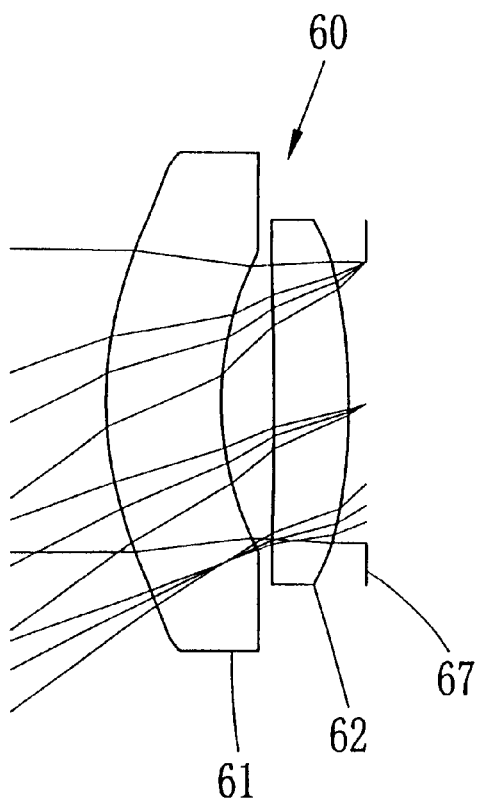
FIG. 15 shows a side elevation of a taking lens in accordance with another embodiment of the present invention.

A taking lens shown in FIG. 15 scaled to an image frame of 16.7×30.2 mm and a relative aperture of f/8.0 is substantially described in table III.

TABLE III

| Lens Surface | Radius of Curvature (mm) | Axial Distance Between Surfaces (mm) | Nd | υd |
|---|---|---|---|---|
| L1 | R1 = 3.792(*) | | | |
| | | D1 = 1.18 | 1.492 | 57.5 |
| L2 | R2 = 3.021 | | | |
| | | D2 = 0.56 | | |
| L3 | R3 = −32.988 | | | |
| | | D3 = 0.75 | 1.492 | 57.5 |
| L4 | R4 = −6.333(*) | | | |
| | | D4 = 0.17 | | |
| Aperture Stop | R5 = ∞ | | | |
| | | D5 = 21.95 | | |
| Image Surface | R6 = −105.0 | | | |

Aspheric Surfaces: L1 and L4

| Aspheric Coefficients: | L1 | L4 |
|---|---|---|
| A | −4.3049E−03 | −7.6905E−04 |
| B | −1.3098E−03 | −4.5860E−04 |
| C | 1.5363E−04 | 0.0 |
| D | −4.2766E−05 | 0.0 |
| Conic Constant: | | |
| K | 1.2429 | 5.811691 |

Parameters:

| f (mm) | f1 (mm) | f2 (mm) | θ (°) | Ep (mm) | δ (mm) | Db (%) | Ds (%) |
|---|---|---|---|---|---|---|---|
| 24.00 | −60.95 | 15.79 | 36.00 | 21.95 | 1.17 | 5.33 | 0.5 |

In Table III, D5 indicates an axial distance between the aperture stop and the paraxial focal point.

As apparent, the taking lens shown in FIG. 15 satisfies the given condition.

Figure 16:
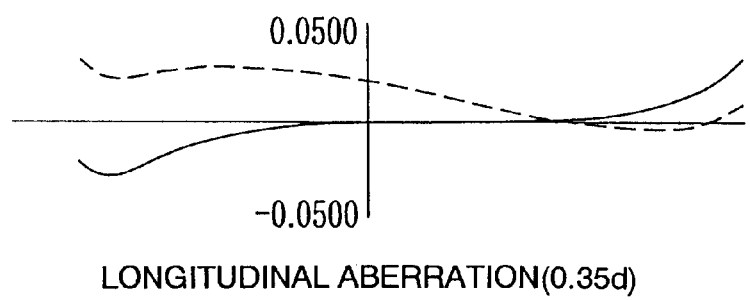
FIG. 16 is an aberration diagram illustrating lateral aberrations at an image height of 0.35 d (1 d is a diagonal length of the image frame) in which a solid line indicates a lateral aberration for a d-line (wave length: 587.56 nm) and a broken line indicates a lateral aberration for a g-line (wave length: 435.84 nm)
Figure 17C:
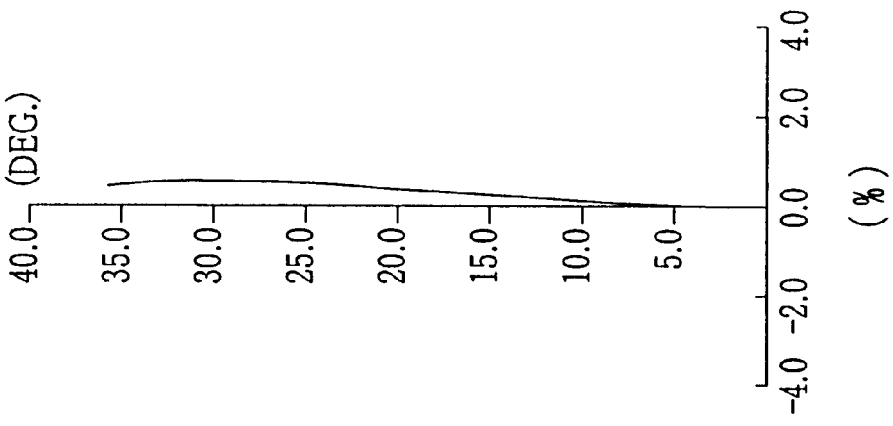
FIG. 17C is an aberration diagram illustrating distortion.
Figure 17B:
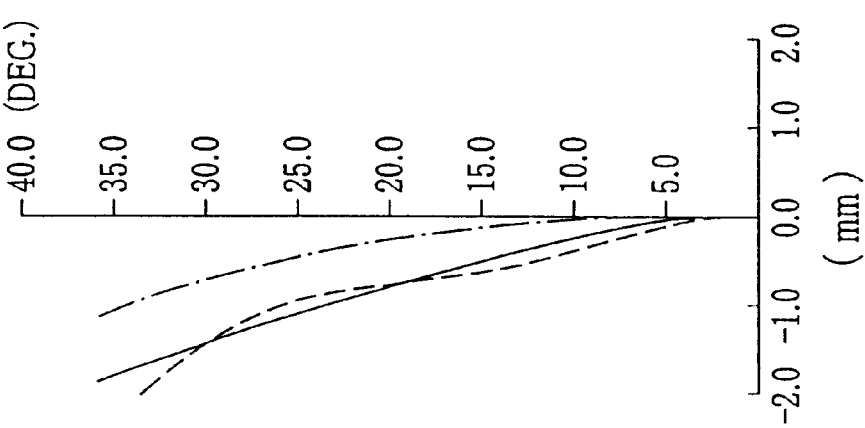
FIG. 17B is an aberration diagram illustrating astigmatism in which a solid line indicates astigmatism in a sagital image surface, a broken line indicates astigmatism in a tangential image surface, and a dotted line indicates a surface curve of the image surface in a diagonal direction.
Figure 17A:
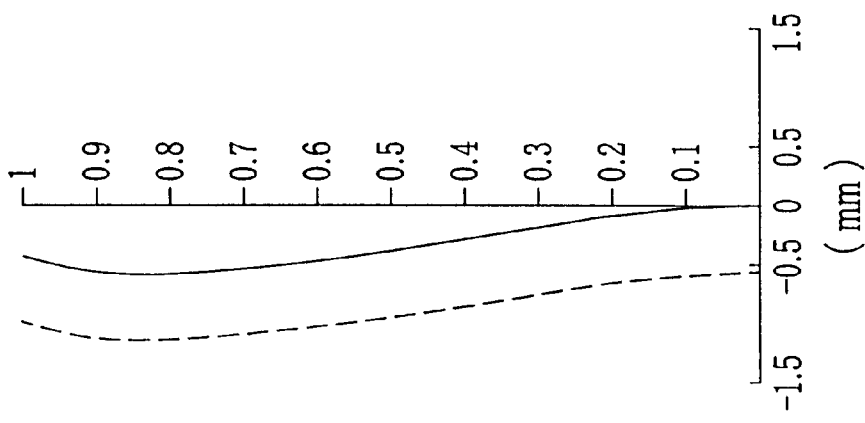
FIG. 17A is an aberration diagram illustrating the curvature of field in which a solid line indicates an aberration for a d-line (wave length: 587.56 nm) and a broken line indicates an aberration for a g-line (wave length: 435.84 nm)

FIGS. 16 and 17A to 17C show lateral aberrations at an image height of 0.35 d, the curvature of field, astigmatism, and distortion, respectively. In FIGS. 16 and 17A, a solid curve indicates an aberration for a d-line (wave length: 587.56 nm), and a broken curve indicates an aberration for a g-line (wave length: 435.84 nm). In FIG. 17B, a solid curve indicates an aberration in a sagital image surface, and a broken curve indicates a tangential image surface, and further a dotted line indicates a curve of the image surface in a diagonal direction.

Figure 18:
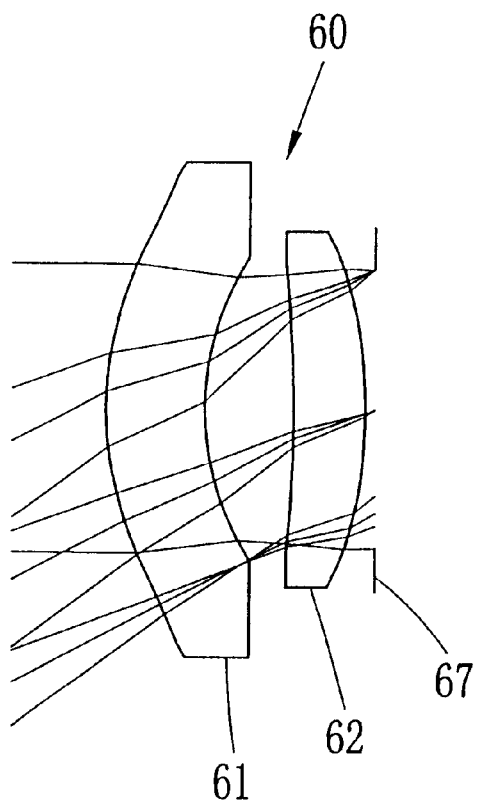
FIG. 18 shows a side elevation of a taking lens in accordance with another embodiment of the present invention.

A taking lens shown in FIG. 18 scaled to an image frame of 16.7×30.2 mm and a relative aperture of f/8.0 is substantially described in table IV.

TABLE IV

| Lens Surface | Radius of Curvature (mm) | Axial Distance Between Surfaces (mm) | Nd | υd |
|---|---|---|---|---|
| L1 | R1 = 3.468(*) | | | |
| | | D1 = 1.02 | 1.492 | 57.5 |
| L2 | R2 = 2.779 | | | |
| | | D2 = 0.95 | | |

TABLE IV-continued

| L3 | R3 = −15.067 | | | |
|---|---|---|---|---|
| | | D3 = 0.76 | 1.492 | 57.5 |
| L4 | R4 = −5.178(*) | | | |
| | | D4 = 0.10 | | |
| Aperture Stop | R5 = ∞ | | | |
| | | D5 = 22.57 | | |
| Image Surface | R6 = −238.40 | D6 = −0.39 | | |

Aspheric Surfaces: L1 and L4

| Aspheric Coefficients: | L1 | L4 |
|---|---|---|
| A | −3.7261E−03 | 5.4786E−04 |
| B | −1.0780E−03 | −3.33950E−4 |
| C | 1.0687E−04 | 0.0 |
| D | −3.4584E−05 | 0.0 |
| Conic Constant: | | |
| K | 0.715646 | 3.818148 |

Parameters:

| f (mm) | f1 (mm) | f2 (mm) | θ (°) | Ep (mm) | δ (mm) | Db (%) | Ds (%) |
|---|---|---|---|---|---|---|---|
| 24.00 | −55.45 | 15.64 | 35.15 | 22.57 | 0.52 | 2.3 | −2.87 |

In Table IV, D5 and D6 indicate an axial distance between the aperture stop and the paraxial focal point and a shift in distance of a best focus position, which is on the surface of filmstrip, from the paraxial focal point, respectively.

As apparent, the taking lens 60 shown in FIG. 18 satisfies the given condition.

Figure 19:
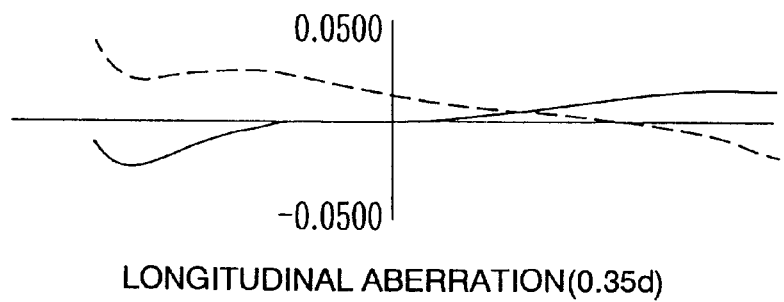
FIG. 19 is an aberration diagram illustrating lateral aberrations at an image height of 0.35 d (1 d is a diagonal length of the image frame) in which a solid line indicates a lateral aberration for a d-line (wave length: 587.56 nm) and a broken line indicates a lateral aberration for a g-line (wave length: 435.84 nm)
Figure 20C:
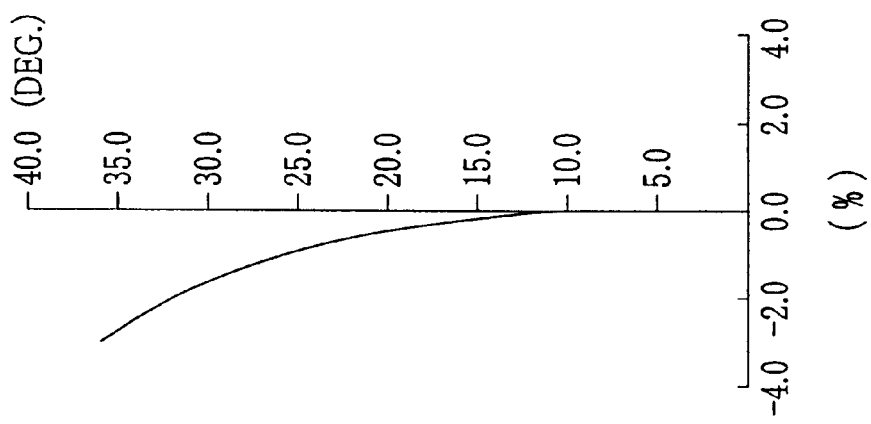
FIG. 20C is an aberration diagram illustrating distortion.
Figure 20B:
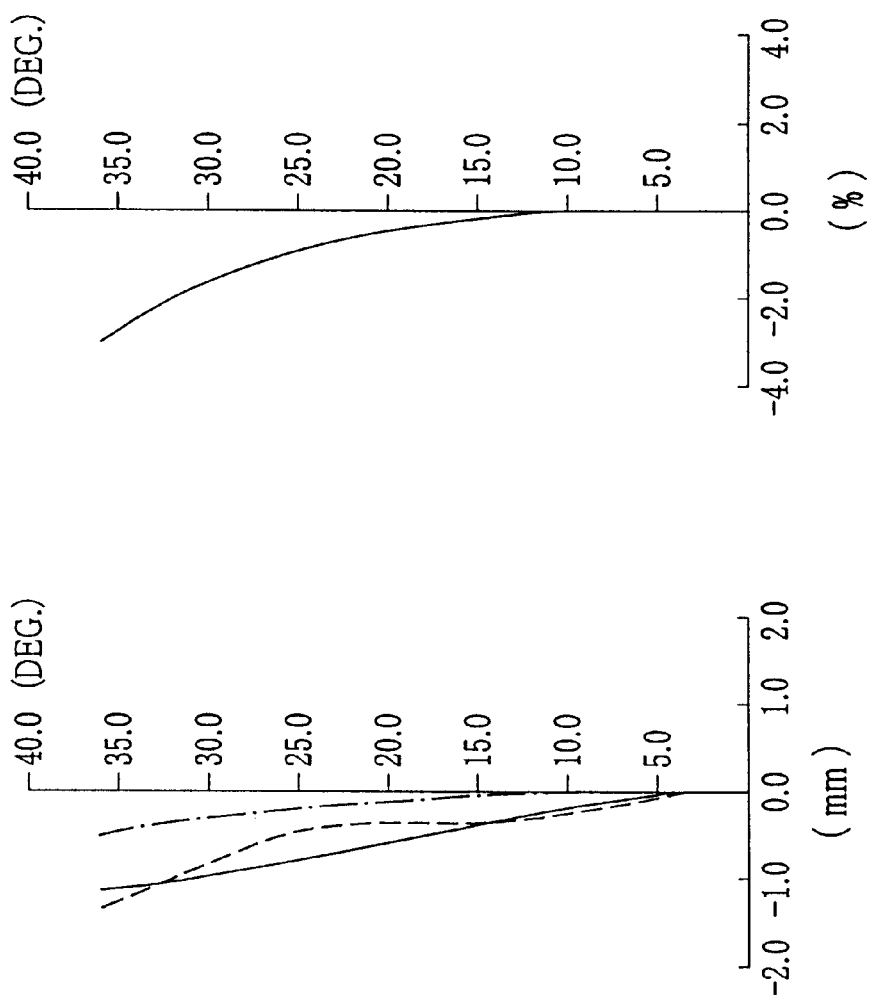
FIG. 20B is an aberration diagram illustrating astigmatism in which a solid line indicates astigmatism in a sagital image surface, a broken line indicates astigmatism in a tangential image surface, and a dotted line indicates a surface curve of the image surface in a diagonal direction.
Figure 20A:
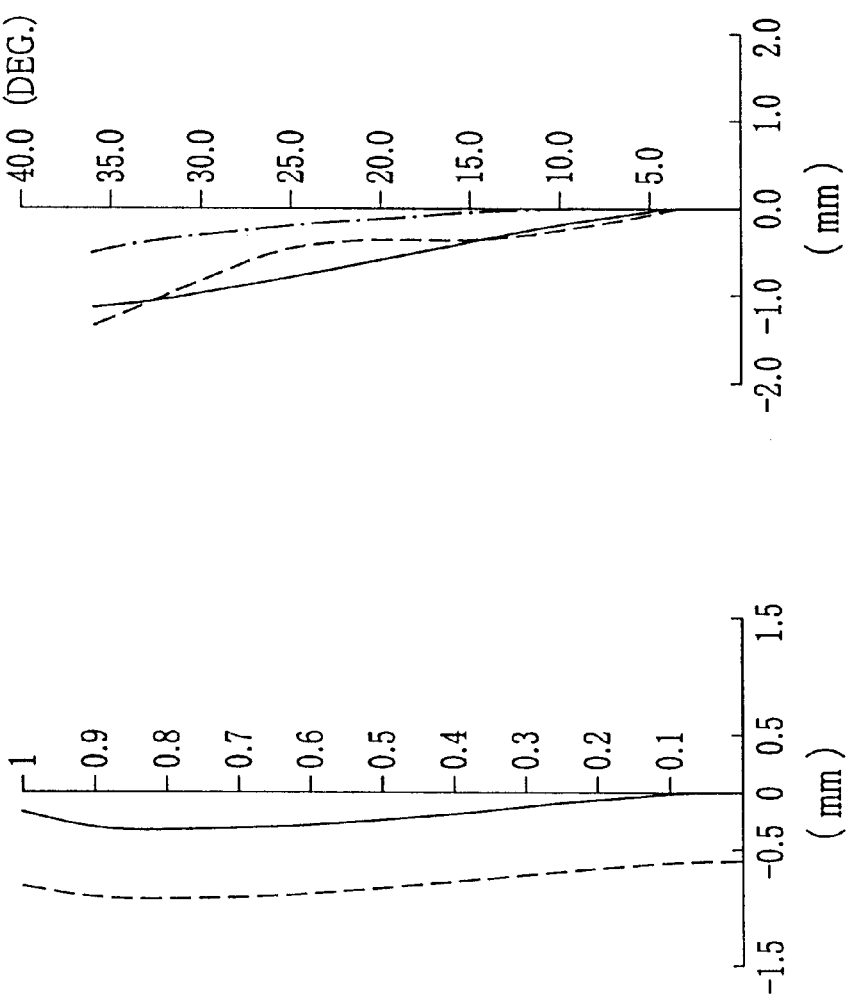
FIG. 20A is an aberration diagram illustrating the curvature of field in which a solid line indicates an aberration for a d-line (wave length: 587.56 nm) and a broken line indicates an aberration for a g-line (wave length: 435.84 nm)

FIGS. 19 and 20A to 20C show lateral aberrations at an image height of 0.35 d, the curvature of field, astigmatism, and distortion, respectively. In FIGS. 19 and 20A, a solid curve indicates an aberration for a d-line (wave length: 587.56 nm), and a broken curve indicates an aberration for a g-line (wave length: 435.84 nm). In FIG. 20B, a solid curve indicates an aberration in a sagital image surface, and a broken curve indicates a tangential image surface, and further a dotted line indicates a curve of the image surface in a diagonal direction.

Figure 21:
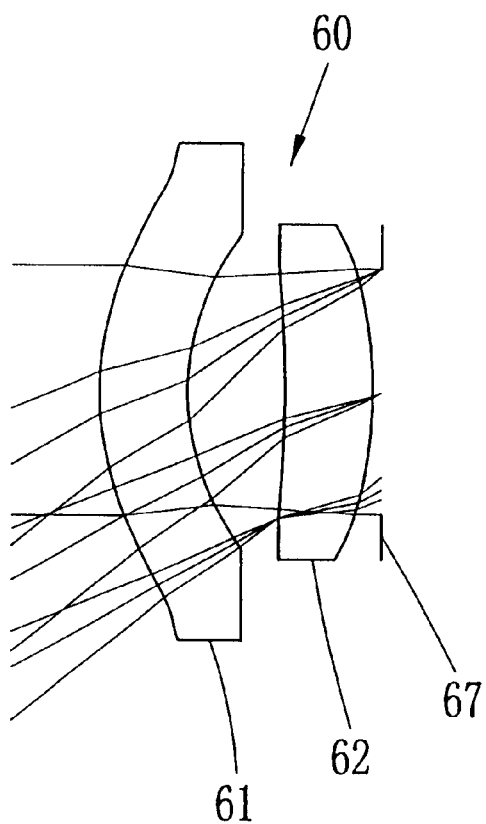
FIG. 21 shows a side elevation of a taking lens in accordance with another embodiment of the present invention.

A taking lens shown in FIG. 21 scaled to an image frame of 16.7×30.2 mm and a relative aperture of f/8.0 is substantially described in table V.

TABLE V

| Lens Surface | Radius of Curvature (mm) | Axial Distance Between Surfaces (mm) | Nd | υd |
|---|---|---|---|---|
| L1 | R1 = 3.424(*) | | | |
| | | D1 = 0.97 | 1.492 | 57.5 |
| L2 | R2 = 2.724 | | | |
| | | D2 = 1.11 | | |
| L3 | R3 = −13.012 | | | |
| | | D3 = 0.99 | 1.492 | 57.5 |
| L4 | R4 = −4.719(*) | | | |
| | | D4 = 0.10 | | |
| Aperture Stop | R5 = ∞ | | | |
| | | D5 = 21.14 | | |
| Image Surface | R6 = −238.40 | D6 = −0.30 | | |

Aspheric Surfaces: L1 and L4

| Aspheric Coefficients: | L1 | L4 |
|---|---|---|
| A | −2.8394E−3 | 4.1873E−4 |
| B | −8.8749E−4 | −3.2995E−4 |
| C | 7.9305E−5 | 0.0 |
| D | −2.3093E−5 | 0.0 |

TABLE V-continued

Conic Constant:

| | | |
|---|---|---|
| K | 0.4287 | 2.2535 |

Parameters:

| f (mm) | f1 (mm) | f2 (mm) | θ (°) | Ep (mm) | δ (mm) | Db (%) | Ds (%) |
|---|---|---|---|---|---|---|---|
| 22.00 | −49.79 | 14.48 | 38.50 | 21.14 | 0.52 | 2.45 | −6.74 |

In Table V, D5 and D6 indicates an axial distance between the aperture stop and the paraxial focal point and a shift in distance of a best focus position from the paraxial focal point, respectively.

As apparent, the taking lens 60 shown in FIG. 21 satisfies the given condition.

Figure 22:
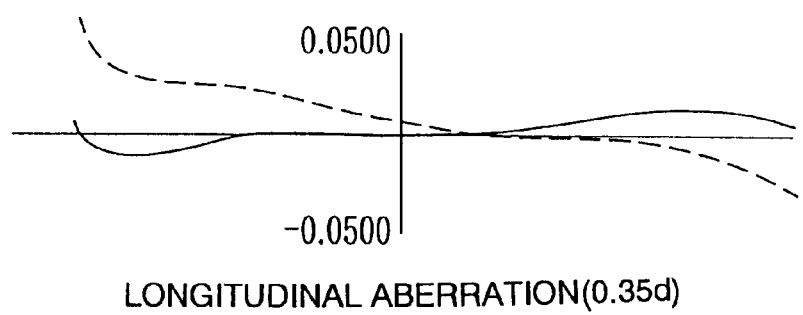
FIG. 22 is an aberration diagram illustrating lateral aberrations at an image height of 0.35 d (1 d is a diagonal length of the image frame) in which a solid line indicates a lateral aberration for a d-line (wave length: 587.56 nm) and a broken line indicates a lateral aberration for a g-line (wave length: 435.84 nm)
Figure 23:
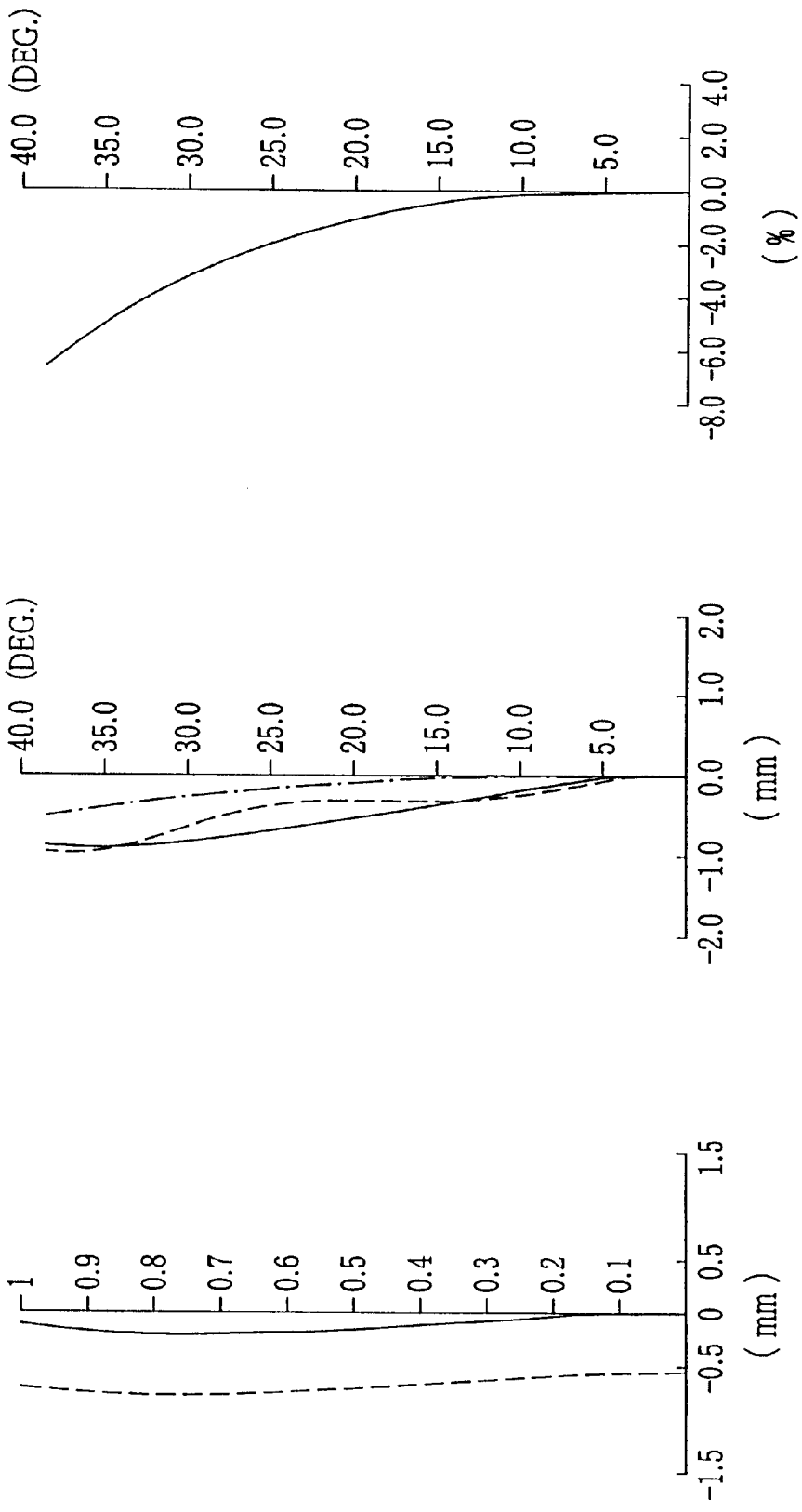
FIG. 23A is an aberration diagram illustrating the curvature of field in which a solid line indicates an aberration for a d-line (wave length: 587.56 nm) and a broken line indicates an aberration for a g-line (wave length: 435.84 nm)
FIG. 23B is an aberration diagram illustrating astigmatism in which a solid line indicates astigmatism in a sagital image surface, a broken line indicates astigmatism in a tangential image surface, and a dotted line indicates a surface curve of the image surface in a diagonal direction.
FIG. 23C is an aberration diagram illustrating distortion.

FIGS. 22 and 23A to 23C show lateral aberrations at an image height of 0.35 d, the curvature of field, astigmatism, and distortion, respectively. In FIGS. 22 and 23A, a solid curve indicates an aberration for a d-line (wave length: 587.56 nm), and a broken curve indicates an aberration for a g-line (wave length: 435.84 nm). In FIG. 23B, a solid curve indicates an aberration in a sagital image surface, and a broken curve indicates a tangential image surface, and further a dotted line indicates a curve of the image surface in a diagonal direction.

A taking lens shown in FIG. 14 scaled to an image frame of 16.7×30.2 mm and a relative aperture of f/8.0 is substantially described in table VI.

TABLE VI

| Lens Surface | Radius of Curvature (mm) | Axial Distance Between Surfaces (mm) | Nd | υd |
|---|---|---|---|---|
| L1 | R1 = 3.797(*) | | | |
| | | D1 = 1.19 | 1.492 | 57.5 |
| L2 | R2 = 3.009 | | | |
| | | D2 = 0.79 | | |
| L3 | R3 = −22.057 | | | |
| | | D3 = 0.74 | 1.492 | 57.5 |
| L4 | R4 = −5.588(*) | | | |
| | | D4 = 0.10 | | |
| Aperture Stop | R5 = ∞ | | | |
| | | D5 = 20.16 | | |
| Image Surface | R6 = −160.0 | | | |

Aspheric Surfaces: L1 and L4

| Aspheric Coefficients: | L1 | L4 |
|---|---|---|
| A | −1.3854E−3 | −2.1127E−3 |
| B | −4.8625E−5 | −1.5657E−4 |
| C | −8.4395E−4 | −1.0348E−4 |
| D | 0.0 | 0.0 |

Conic Constant:

| | | |
|---|---|---|
| K | −0.5100 | 2.1701 |

Parameters:

| f (mm) | f1 (mm) | f2 (mm) | θ (°) | Ep (mm) | δ (mm) | Db (%) | Ds (%) |
|---|---|---|---|---|---|---|---|
| 22.50 | −58.85 | 14.99 | 37.00 | 20.79 | 0.78 | 3.75 | −2.12 |

In Table VI, D5 indicates an axial distance between the aperture stop and the paraxial focal point.

Figure 24:
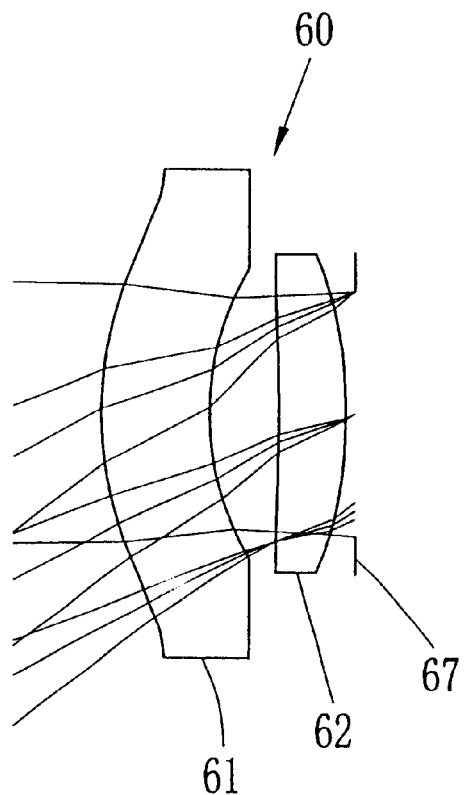
FIG. 24 shows a side elevation of a taking lens in accordance with another embodiment of the present invention.

As apparent, the taking lens 60 shown in FIG. 24 satisfies the condition (I).

Figure 25:
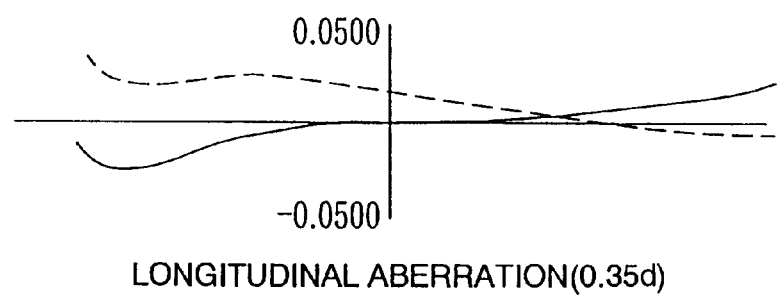
FIG. 25 is an aberration diagram illustrating lateral aberrations at an image height of 0.35 d (1 d is a diagonal length of the image frame) in which a solid line indicates a lateral aberration for a d-line (wave length: 587.56 nm) and a broken line indicates a lateral aberration for a g-line (wave length: 435.84 nm)

FIGS. 25 and 26A to 26C show lateral aberrations at an image height of 0.35 d, the curvature of field, astigmatism, and distortion, respectively. In FIGS. 25 and 26A, a solid curve indicates an aberration for a d-line (wave length: 587.56 nm), and a broken curve indicates an aberration for a g-line (wave length: 435.84 nm). In FIG. 26B, a solid curve indicates an aberration in a sagital image surface, and a broken curve indicates a tangential image surface, and further a dotted line indicates a curve of the image surface in a diagonal direction.

Figure 27:
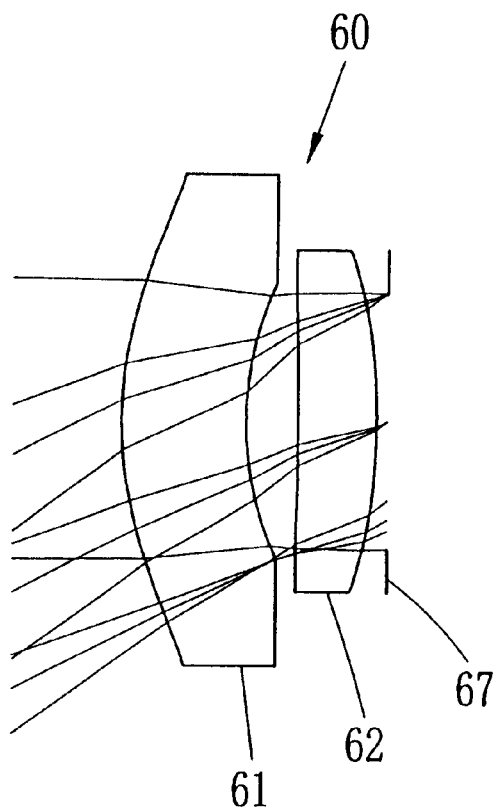
FIG. 27 shows a side elevation of a taking lens in accordance with another embodiment of the present invention.

A taking lens shown in FIG. 27 scaled to an image frame of 16.7×30.2 mm and a relative aperture of f/9.5 is substantially described in table VII.

TABLE VII

| Lens Surface | Radius of Curvature (mm) | Axial Distance Between Surfaces (mm) | Nd | υd |
|---|---|---|---|---|
| L1 | R1 = 3.641(*) | | | |
| | | D1 = 1.12 | 1.492 | 57.5 |
| L2 | R2 = 2.831 | | | |
| | | D2 = 0.47 | | |
| L3 | R3 = −35.985 | | | |
| | | D3 = 0.70 | 1.492 | 57.5 |
| L4 | R4 = −5.980(*) | | | |
| | | D4 = 0.10 | | |
| Aperture Stop | R5 = ∞ | | | |
| | | D5 = 21.63 | | |
| Image surface | R6 = −105.0 | | | |

Aspheric Surfaces: L1 and L4
Aspheric Coefficients:

| | L1 | L4 |
|---|---|---|
| A | −5.6124E − 3 | −1.5256E − 3 |
| B | −1.4037E − 3 | −7.0369E − 4 |
| C | 8.1897E − 5 | 7.1196E − 5 |
| D | −4.8997E − 5 | 0.0 |

Conic Constant:

| | | |
|---|---|---|
| K | 1.153815 | 6.015187 |

Parameters:

| f(mm) | f1(mm) | f2(mm) | θ(°) | Ep(mm) | δ(mm) | Db(%) | Ds(%) |
|---|---|---|---|---|---|---|---|
| 23.50 | −47.38 | 14.46 | 35.84 | 21.63 | 1.17 | 5.4 | −0.492 |

In Table VII, D5 indicates an axial distance between the aperture stop and the paraxial focal point.

As apparent, the taking lens 60 shown in FIG. 27 satisfies the condition (I).

Figure 28:
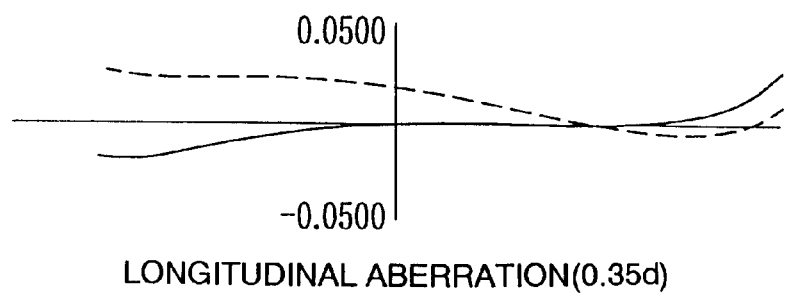
FIG. 28 is an aberration diagram illustrating lateral aberrations at an image height of 0.35 d (1 d is a diagonal length of the image frame) in which a solid line indicates a lateral aberration for a d-line (wave length: 587.56 nm) and a broken line indicates a lateral aberration for a g-line (wave length: 435.84 nm)
Figure 29C:
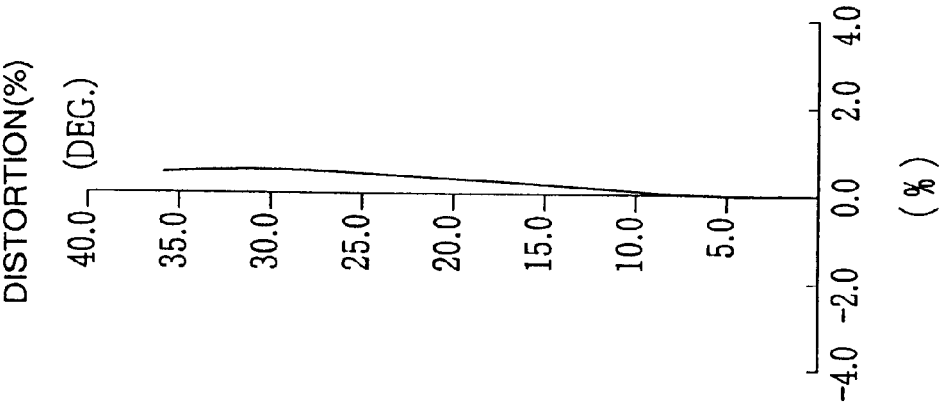
FIG. 29C is an aberration diagram illustrating distortion.
Figure 29B:
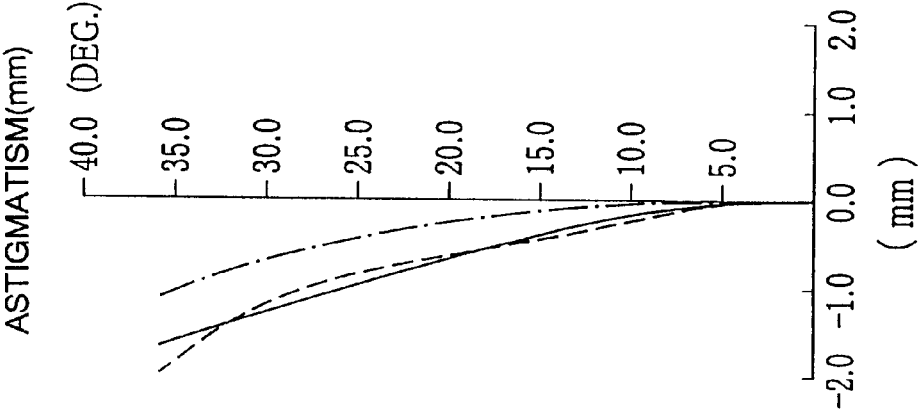
FIG. 29B is an aberration diagram illustrating astigmatism in which a solid line indicates astigmatism in a sagital image surface, a broken line indicates astigmatism in a tangential image surface, and a dotted line indicates a surface curve of the image surface in a diagonal direction.
Figure 29A:
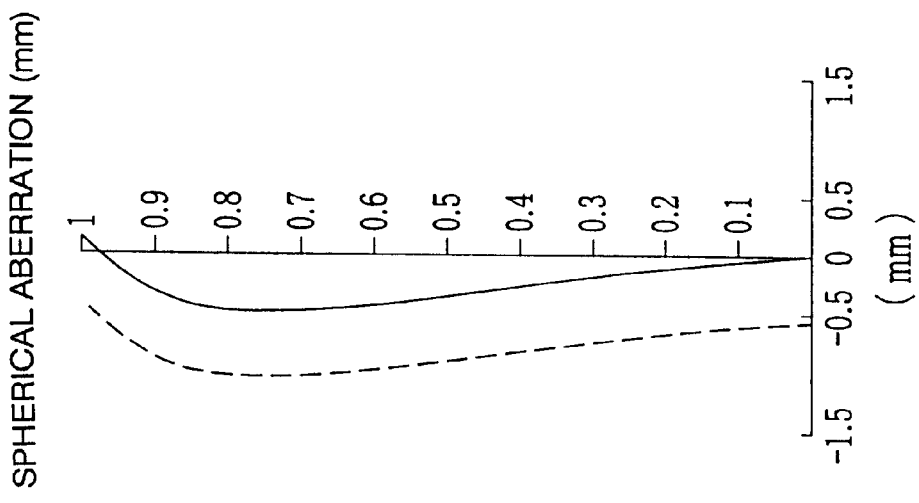
FIG. 29A is an aberration diagram illustrating the curvature of field in which a solid line indicates an aberration for a d-line (wave length: 587.56 nm) and a broken line indicates an aberration for a g-line (wave length: 435.84 nm)

FIGS. 28 and 29A to 29C show lateral aberrations at an image height of 0.35 d, the curvature of field, astigmatism, and distortion, respectively. In FIGS. 28 and 29A, a solid curve indicates an aberration for a d-line (wave length: 587.56 nm), and a broken curve indicates an aberration for a g-line (wave length: 435.84 nm). In FIG. 29B, a solid curve indicates an aberration in a sagital image surface, and a broken curve indicates a tangential image surface, and further a dotted line indicates a curve of the image surface in a diagonal direction.

Figure 30:
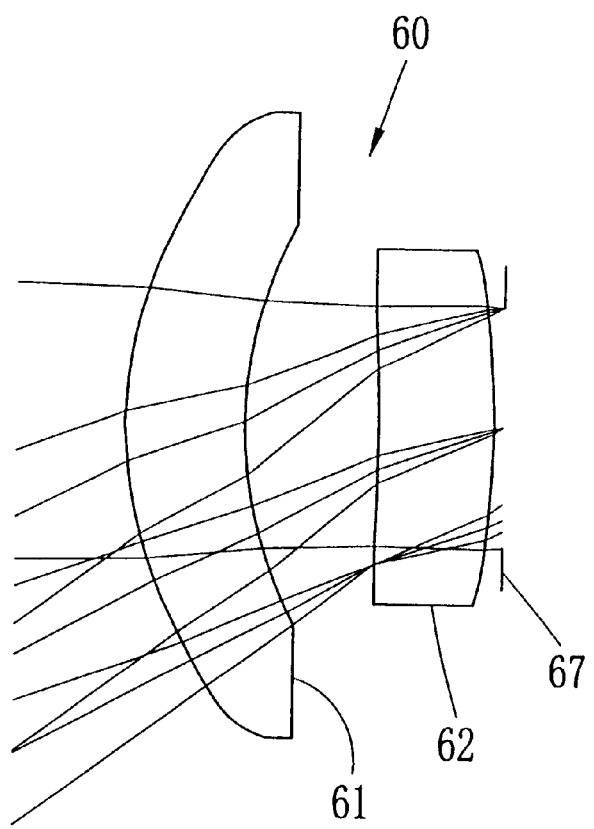
FIG. 30 shows a side elevation of a taking lens in accordance with still another embodiment of the present invention.

A taking lens shown in FIG. 30 scaled to an image frame of 16.7×30.2 mm and a relative aperture of f/9.5 is substantially described in table VIII.

TABLE VIII

| Lens Surface | Radius of Curvature (mm) | Axial Distance Between Surfaces (mm) | Nd | vd |
|---|---|---|---|---|
| L1 | R1 = 3.922(*) | | | |
| | | D1 = 1.05 | 1.492 | 57.5 |
| L2 | R2 = 3.972 | | | |
| | | D2 = 1.173 | | |
| L3 | R3 = −21.720 | | | |
| | | D3 = 1.0 | 1.492 | 57.5 |
| L4 | R4 = −8.817(*) | | | |
| | | D4 = 0.10 | | |
| Aperture Stop | R5 = ∞ | | | |
| | | D5 = 21.1 | | |
| Image surface | R6 = −105.0 | | | |

Aspheric Surfaces: L1 and L4
Aspheric Coefficients:

| | L1 | L4 |
|---|---|---|
| A | −0.184367E − 2 | −0.51317E − 3 |
| B | −0.710563E − 3 | 0.520461E − 3 |
| C | 0.105702E − 3 | −0.143913E − 3 |
| D | −0.17177E − 4 | 0.0 |

Conic Constant:

| | | |
|---|---|---|
| K | 0.930113 | 2.760908 |

Parameters:

| f(mm) | f1(mm) | f2(mm) | θ(°) | Ep(mm) | δ(mm) | Db(%) | Ds(%) |
|---|---|---|---|---|---|---|---|
| 23.5 | 79.77 | 29.41 | 36.15 | 21.1 | 1.17 | 5.55 | 0.6 |

In Table VIII, D5 indicates an axial distance between the aperture stop and the paraxial focal point.

As apparent, the taking lens 60 shown in FIG. 30 satisfies the condition (I).

Figure 31:
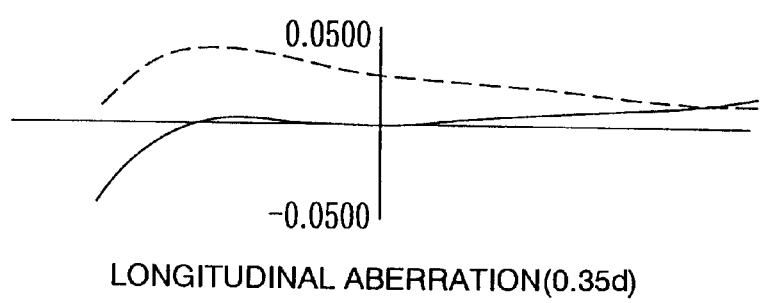
FIG. 31 is an aberration diagram illustrating lateral aberrations at an image height of 0.35 d (1 d is a diagonal length of the image frame) in which a solid line indicates a lateral aberration for a d-line (wave length: 587.56 nm) and a broken line indicates a lateral aberration for a g-line (wave length: 435.84 nm)
Figure 32C:
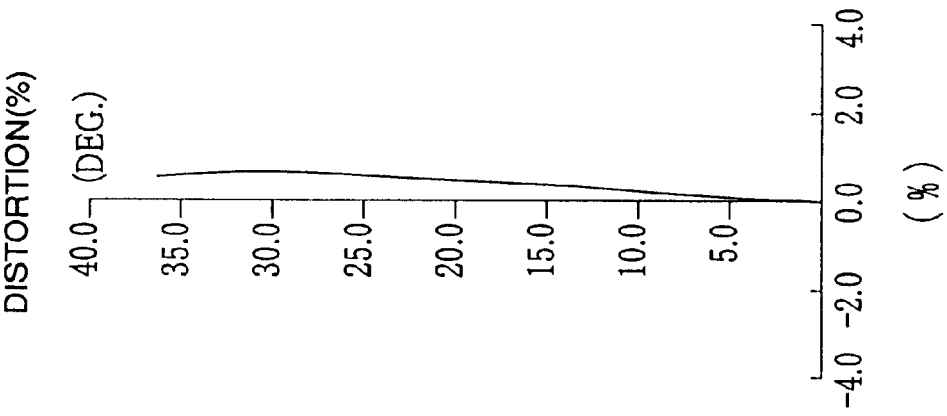
FIG. 32C is an aberration diagram illustrating distortion.
Figure 32B:
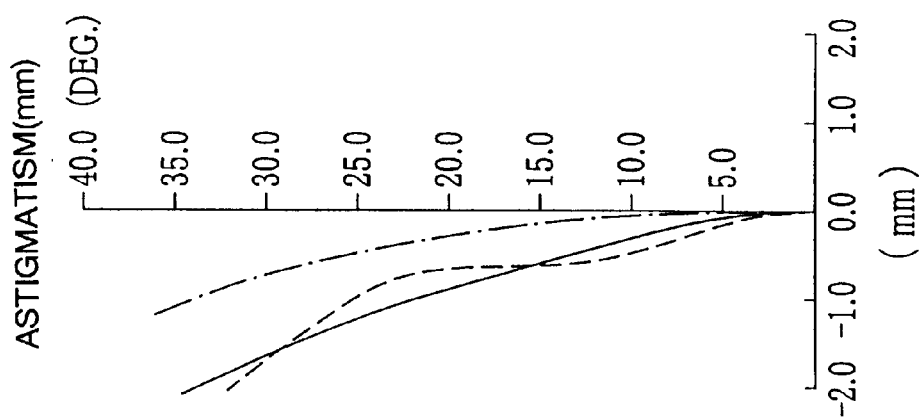
FIG. 32B is an aberration diagram illustrating astigmatism in which a solid line indicates astigmatism in a sagital image surface, a broken line indicates astigmatism in a tangential image surface, and a dotted line indicates a surface curve of the image surface in a diagonal direction.
Figure 32A:
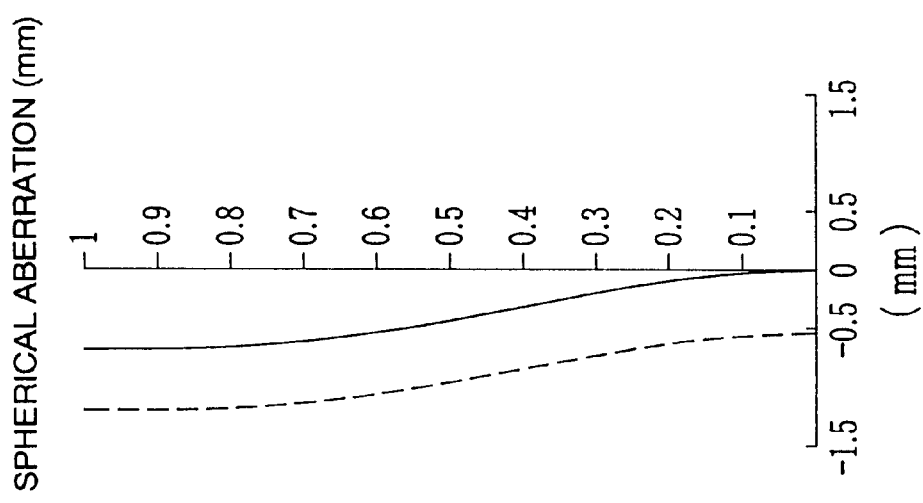
FIG. 32A is an aberration diagram illustrating the curvature of field in which a solid line indicates an aberration for a d-line (wave length: 587.56 nm) and a broken line indicates an aberration for a g-line (wave length: 435.84 nm)

FIGS. 31 and 32A to 32C show lateral aberrations at an image height of 0.35 d, the curvature of field, astigmatism, and distortion, respectively. In FIGS. 31 and 32A, a solid curve indicates an aberration for a d-line (wave length: 587.56 nm), and a broken curve indicates an aberration for a g-line (wave length: 435.84 nm). In FIG. 32B, a solid curve indicates an aberration in a sagital image surface, and a broken curve indicates a tangential image surface, and further a dotted line indicates a curve of the image surface in a diagonal direction.

Figure 33:
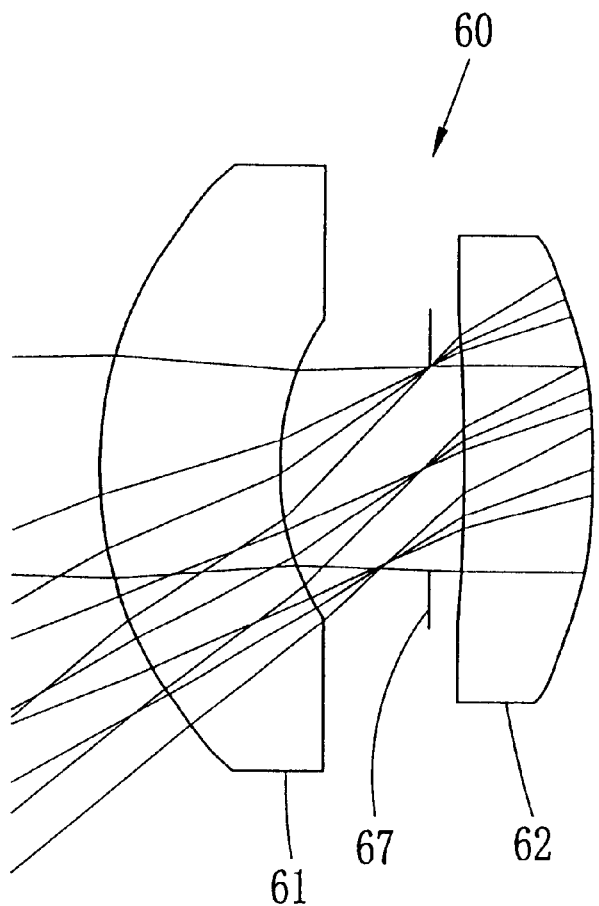
FIG. 33 shows a side elevation of a taking lens in accordance with a further embodiment of the present invention.

A taking lens shown in FIG. 33 scaled to an image frame of 16.7×30.2 mm and a relative aperture of f/9.5 is substantially described in table IX.

TABLE IX

| Lens Surface | Radius of Curvature (mm) | Axial Distance Between Surfaces (mm) | Nd | vd |
|---|---|---|---|---|
| L1 | R1 = 4.735(*) | | | |
| | | D1 = 2.00 | 1.492 | 57.5 |
| L2 | R2 = 3.856 | | | |
| | | D2 = 1.64 | | |
| Aperture Stop | R3 = ∞ | | | |
| | | D3 = 0.38 | | |
| L3 | R4 = −18.285 | | | |
| | | D4 = 1.40 | 1.492 | 57.5 |
| L4 | R5 = −95.997(*) | | | |
| | | D5 = 20.27 | | |
| Image surface | R6 = −105.0 | | | |

Aspheric Surfaces: L1 and L4
Aspheric Coefficients:

| | L1 | L4 |
|---|---|---|
| A | 2.0032E − 3 | −1.0088E − 3 |
| B | 1.2523E − 5 | −6.1591E − 5 |
| C | 8.6244E − 5 | 2.4031E − 6 |
| D | 0.0 | 0.0 |

Conic Constant:

| | | |
|---|---|---|
| K | 0.0 | 0.0 |

Parameters:

| f(mm) | f1(mm) | f2(mm) | θ(°) | Ep(mm) | δ(mm) | Db(%) | Ds(%) |
|---|---|---|---|---|---|---|---|
| 22.5 | −167.6 | 17.48 | 38.8 | 25.0 | 1.17 | 4.68 | −7.55 |

In Table IX, D2 and D3 indicate axial distances between the aperture stop and the second and third lens surfaces L2 and L3, respectively.

As apparent, the taking lens 60 shown in FIG. 33 satisfies the condition (I).

Figure 34:
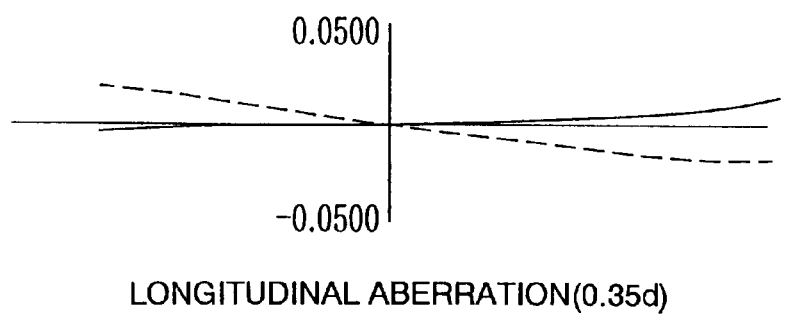
FIG. 34 is an aberration diagram illustrating lateral aberrations at an image height of 0.35 d (1 d is a diagonal length of the image frame) in which a solid line indicates a lateral aberration for a d-line (wave length: 587.56 nm) and a broken line indicates a lateral aberration for a g-line (wave length: 435.84 nm)
Figure 35C:
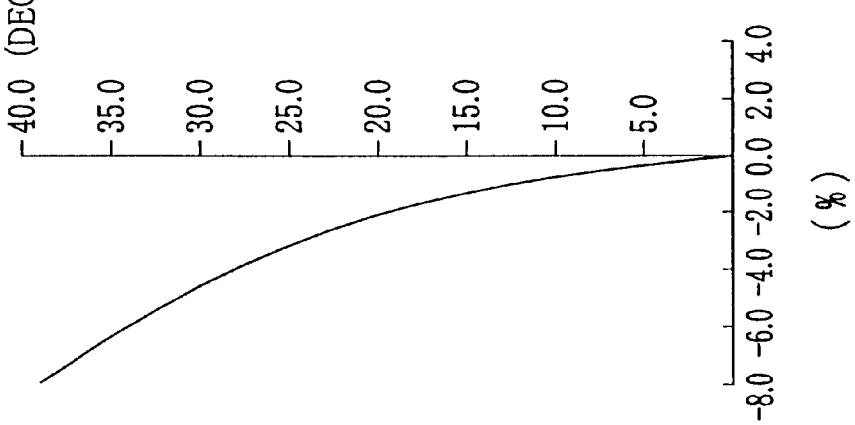
FIG. 35C is an aberration diagram illustrating distortion.
Figure 35B:
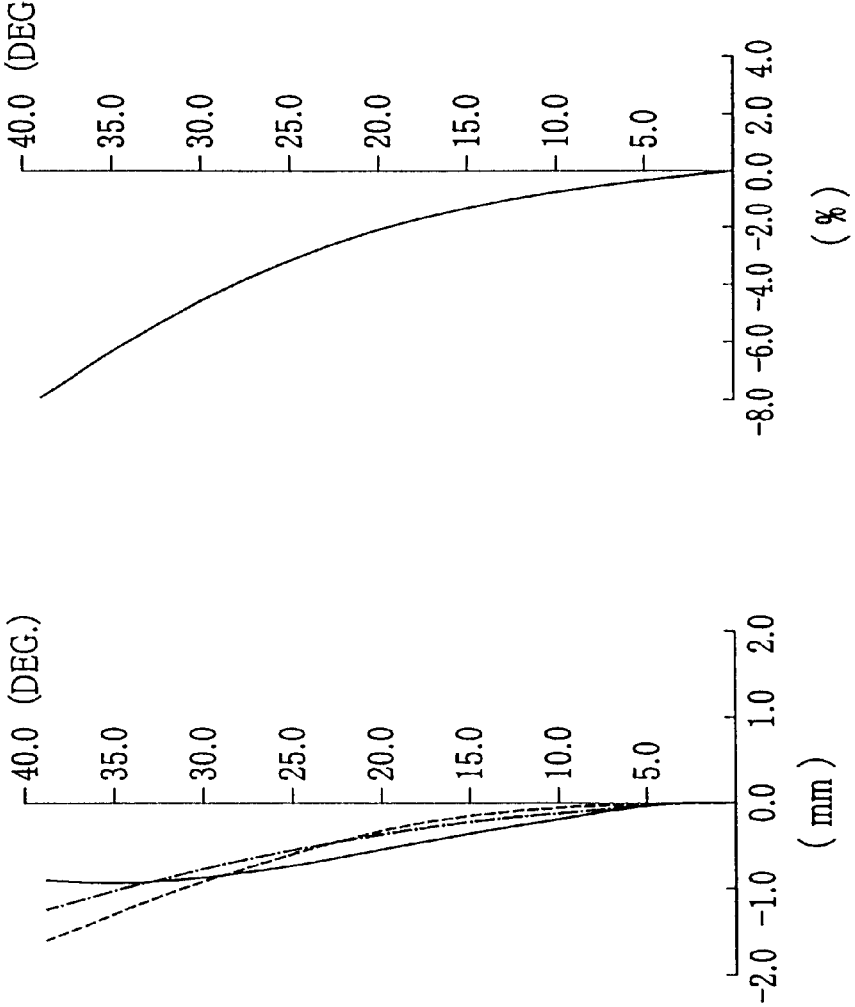
FIG. 35B is an aberration diagram illustrating astigmatism in which a solid line indicates astigmatism in a sagital image surface, a broken line indicates astigmatism in a tangential image surface, and a dotted line indicates a surface curve of the image surface in a diagonal direction.
Figure 35A:
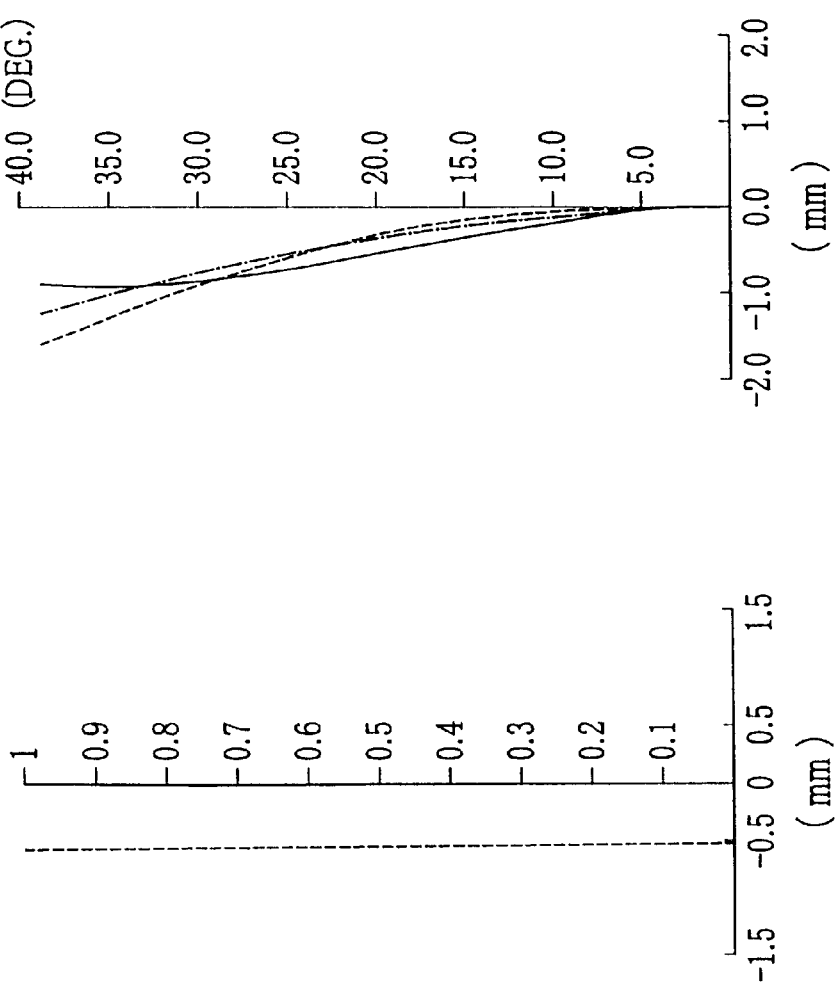
FIG. 35A is an aberration diagram illustrating the curvature of field in which a solid line indicates an aberration for a d-line (wave length: 587.56 nm) and a broken line indicates an aberration for a g-line (wave length: 435.84 nm)

FIGS. 34 and 35A to 35C show lateral aberrations at an image height of 0.35 d, the curvature of field, astigmatism, and distortion, respectively. In FIGS. 34 and 35A, a solid curve indicates an aberration for a d-line (wave length: 587.56 nm), and a broken curve indicates an aberration for a g-line (wave length: 435.84 nm). In FIG. 35B, a solid curve indicates an aberration in a sagital image surface, and a broken curve indicates a tangential image surface, and further a dotted line indicates a curve of the image surface in a diagonal direction.

The taking lens 60 may be used with a lens-fitted film unit preloaded with a conventional 135 format film cartridge which contains a 35 mm filmstrip having 24×36 mm image size. Further, the taking lens 60 may be used with a conventional cameras designed and adapted to use an IX240 type film cartridge for APS. In such a case the data relating to distortion of the taking lens 60 may be recorded on a filmstrip that is loaded, optically or magnetically.

It is to be understood that although the present invention has been described in detail with regard to a preferred embodiment thereof, various other embodiments and variants may occur to those skilled in the art, which are within the scope and spirit of the invention, and such other embodiments and variants are intended to be covered by the following claims.

What is claimed is:

1. A taking lens for forming an image on a filmstrip placed on an image surface that is curved in a lengthwise direction of the filmstrip and has a center of curvature on the object end so as to correct the curvature of field of said taking lens in said image surface, said taking lens comprising in order from the object end to the image end a meniscus first lens element having a convex object side surface and a meniscus second lens element having a convex image side surface and satisfying the following condition, $$-10\% \leq Ds \leq Db - 0.5\%$$

where

Ep is the axial distance between the curved image surface and an exit pupil of the taking lens and takes a value in mm greater than zero;

δ is the axial distance of opposite lengthwise ends of the curve image surface from the center of the curved image surface and takes a value in mm greater than zero;

Ds is optical distortion in a plane including a paraxial focal point of light rays traveling from the exit pupil of the taking lens to a corners of the curved image surface and take a value in %;

Db is given by (δ/Ep)×100%.

2. A taking lens as defined in claim 1, wherein said convex object side surface of said meniscus first lens element and said convex image side surface of said meniscus second lens element are defined by the following equation:

$$Z=ch^2/[1+\{1-(1+K)c^2h^2\}^{1/2}]+Ah^4+Bh^66+Ch^8+Dh^{10}$$

where

Z is the surface sag at a semi-aperture distance h from the optical axis of the taking lens;

c is the curvature of a lens surface at the optical axis equal to the reciprocal of the radius at the optical axis;

K is a conic constant;

A, B, C and D are aspheric Coefficients.

3. A taking lens as defined in claim 1, and further comprising an aperture stop disposed on an image side of said meniscus second lens element.

4. A taking lens as defined in claim 1, and further comprising an aperture stop disposed between said meniscus first lens element and said meniscus second lens element.

5. A lens-fitted film unit comprising:

a light-tight unit housing;

a taking lens fixedly attached to said unit housing, said taking lens comprising in order from the object end to the image end a meniscus first lens element having a convex object side surface and a meniscus second lens element having a convex image side surface;

an image plane formed behind said taking lens in said unit housing, said image plane being curved in a lengthwise direction and has a center of curvature on an optical axis of said taking lens on the object end so that an image focused on an image surface on said image plane is free from the curvature of field of said taking lens; and a film cartridge with an unexposed filmstrip, said cartridge being preloaded in said unit housing and carrying data of distortion relating to said taking lens which is used to correct optical distortion of an image formed on said filmstrip by said taking lens through digital image processing;

wherein said taking lens said taking satisfying the following condition, $$-10\% \leq Ds \leq Db-0.5\%$$

where

Ep is the axial distance between the curved image surface and an exit pupil of the taking lens and takes a value in mm greater than zero;

δ is the axial distance of opposite lengthwise ends of the curve image surface from the center of the curved image surface and takes a value in mm greater than zero;

Ds is optical distortion in a plane including a paraxial focal point of light rays traveling from the exit pupil of the taking lens to a corners of the curved image surface and take a value in %;

Db is given by (δ/Ep)×100%.

6. A taking lens as defined in claim 5, wherein said convex object side surface of said meniscus first lens element and said convex image side surface of said meniscus second lens element are defined by the following equation:

$$Z=ch^2/[1+\{1-(1+K)c^2h^2\}^{1/2}]+Ah^4Bh^66+Ch^8+Dh^{10}$$

where

Z is the surface sag at a semi-aperture distance h from the optical axis of the taking lens;

c is the curvature of a lens surface at the optical axis equal to the reciprocal of the radius at the optical axis;

K is a conic constant;

A, B, C and D are aspheric Coefficients.

7. A taking lens as defined in claim 5, and further comprising an aperture stop disposed on an image side of said meniscus second lens element.

8. A taking lens as defined in claim 5, and further comprising an aperture stop disposed between said meniscus first lens element and said meniscus second lens element.

9. A lens-fitted film unit comprising:

a light-tight unit housing;

a taking lens fixedly attached to said unit housing, said taking lens comprising in order from the object end to the image end a meniscus first lens element having a convex object side surface and a meniscus second lens element having a convex image side surface;

an image plane formed behind said taking lens in said unit housing, said image plane being curved in a lengthwise direction and has a center of curvature on an optical axis of said taking lens on the object end so that an image focused on said curved image surface is free from the curvature of field of said taking lens; and an unexposed filmstrip preloaded in said unit housing, said unexposed filmstrip carrying data relating to distortion of said taking lens which is used to correct optical distortion of an image formed on said filmstrip by said taking lens through digital image processing;

wherein said taking lens said taking satisfying the following condition, $$-10\% \leq Ds \leq Db-0.5\%$$

where

Ep is the axial distance between the curved image surface and an exit pupil of the taking lens and takes a value in mm greater than zero;

δ is the axial distance of opposite lengthwise ends of the curve image surface from the center of the curved image surface and takes a value in mm greater than zero;

Ds is optical distortion in a plane including a paraxial focal point of light rays traveling from the exit pupil of the taking lens to a corners of the curved image surface and take a value in %;

Db is given by (δ/Ep)×100%.

10. A taking lens as defined in claim 9, wherein said data of distortion is optically recorded as an latent image on said filmstrip.

11. A taking lens as defined in claim 9, wherein said data of distortion is magnetically recorded on said film strip.

12. A taking lens as defined in claim 9, wherein said convex object side surface of said meniscus first lens element and said convex image side surface of said meniscus second lens element are defined by the following equation:

$$Z=ch^2/[1+\{1(1+K)c^2h^2\}^{1/2}]+Ah^4+Bh^6+Ch^8Dh^{10}$$

where

Z is the surface sag at a semi-aperture distance h from the optical axis of the taking lens;

c is the curvature of a lens surface at the optical axis equal to the reciprocal of the radius at the optical axis;

K is a conic constant;

A, B, C and D are aspheric Coefficients.

13. A taking lens as defined in claim 9, and further comprising an aperture stop disposed on an image side of said meniscus second lens element.

14. A taking lens as defined in claim 9, and further comprising an aperture stop disposed between said meniscus first lens element and said meniscus second lens element.

* * * * *